(12) United States Patent
Scholz

(10) Patent No.: US 9,109,700 B2
(45) Date of Patent: Aug. 18, 2015

(54) LOW LEAKAGE RATE COMPOSITE GASKET

(75) Inventor: Hermann Scholz, Ottobrunn (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 13/822,778

(22) PCT Filed: Sep. 30, 2010

(86) PCT No.: PCT/EP2010/064585
§ 371 (c)(1),
(2), (4) Date: Mar. 13, 2013

(87) PCT Pub. No.: WO2012/041381
PCT Pub. Date: Apr. 5, 2012

(65) Prior Publication Data
US 2013/0175766 A1  Jul. 11, 2013

(51) Int. Cl.
*F16J 15/14* (2006.01)
*F16J 15/02* (2006.01)
*F16J 15/10* (2006.01)

(52) U.S. Cl.
CPC .............. *F16J 15/022* (2013.01); *F16J 15/102* (2013.01); *F16J 15/104* (2013.01)

(58) Field of Classification Search
CPC ........ F16J 15/022; F16J 15/102; F16J 15/104
USPC ................................. 277/590, 593, 598, 639
See application file for complete search history.

(56) References Cited

U.S. PATENT DOCUMENTS

| | | | |
|---|---|---|---|
| 3,953,566 A | | 4/1976 | Gore |
| 4,026,565 A | * | 5/1977 | Jelinek .......................... 277/639 |
| 4,487,421 A | * | 12/1984 | Housas et al. ................ 277/616 |
| 5,128,209 A | * | 7/1992 | Sakai et al. .................... 428/421 |
| 5,486,010 A | | 1/1996 | Hamilton et al. |
| 5,492,336 A | | 2/1996 | Barna et al. |
| 5,494,301 A | | 2/1996 | Hamilton et al. |
| 5,641,566 A | * | 6/1997 | Kranzler et al. ........... 428/315.7 |
| 5,708,044 A | | 1/1998 | Branca |
| 5,879,789 A | * | 3/1999 | Dolan et al. .................. 428/212 |
| 5,964,465 A | | 10/1999 | Mills et al. |

(Continued)

FOREIGN PATENT DOCUMENTS

| | | |
|---|---|---|
| DE | 19546161 A1 | 6/1997 |
| EP | 1873427 A1 * | 1/2008 |

(Continued)

*Primary Examiner* — Vishal Patel
*Assistant Examiner* — Christine M Mills
(74) *Attorney, Agent, or Firm* — Allan M. Wheatcraft

(57) ABSTRACT

A gasket comprising a first discrete component and a second discrete component, wherein the first and second components extend along the length of the gasket. The second component is arranged ranged relative to the first component so as to separate the first component at least from one of the two sealing surfaces. The first component is relatively hard in at least the thickness direction of the gasket and preferably incompressible and the second component is relatively soft in at least the thickness direction of the gasket and compressible. When the gasket is compressed between two flanges, there is a limited region of high compression, because the first component increases the pressure by which the second component is compressed between the surfaces of the flanges. This yields a high leak tightness of the sealing at a relatively low force.

11 Claims, 15 Drawing Sheets

(56) References Cited

U.S. PATENT DOCUMENTS

Figure 4A:
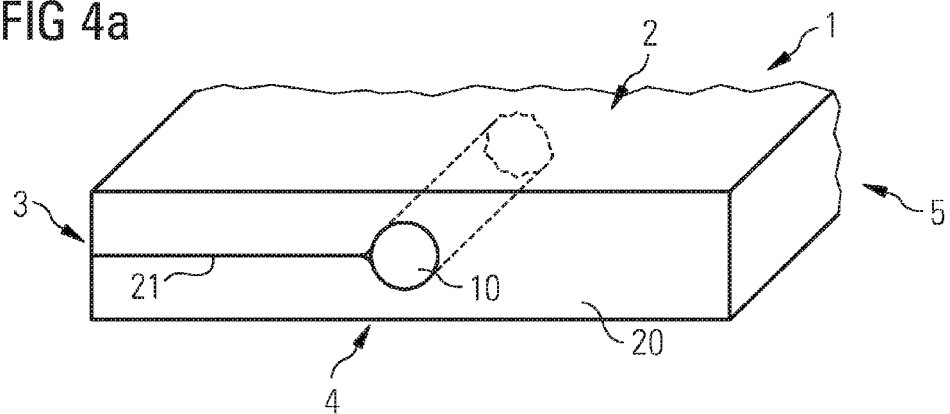

| | | | |
|---|---|---|---|
| 6,030,694 A | 2/2000 | Dolan et al. | |
| 6,485,809 B1 | 11/2002 | Minor et al. | |
| 6,541,589 B1 | 4/2003 | Baillie | |
| 7,179,525 B2 | 2/2007 | Dove | |
| 7,361,398 B2 | 4/2008 | Dove | |
| 7,392,989 B2 * | 7/2008 | Corbett, Jr. | 277/606 |
| 7,531,611 B2 | 5/2009 | Sabol et al. | |
| 2004/0173978 A1 * | 9/2004 | Bowen et al. | 277/650 |
| 2006/0181032 A1 | 8/2006 | Riggs et al. | |
| 2007/0293592 A1 * | 12/2007 | Jacobs et al. | 521/50.5 |
| 2009/0093602 A1 | 4/2009 | Ford | |
| 2010/0270753 A1 | 10/2010 | Knapp | |

FOREIGN PATENT DOCUMENTS

| | | |
|---|---|---|
| FR | 1428571 A | 2/1966 |
| WO | WO2008/010081 A2 | 1/2008 |
| WO | WO 2008010081 A2 * | 1/2008 |

* cited by examiner

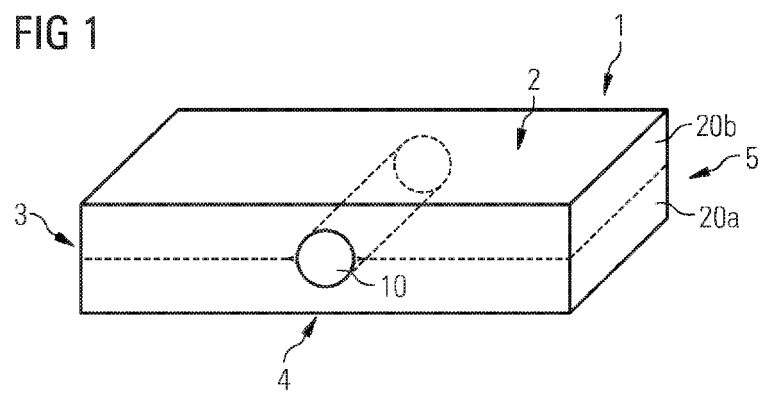
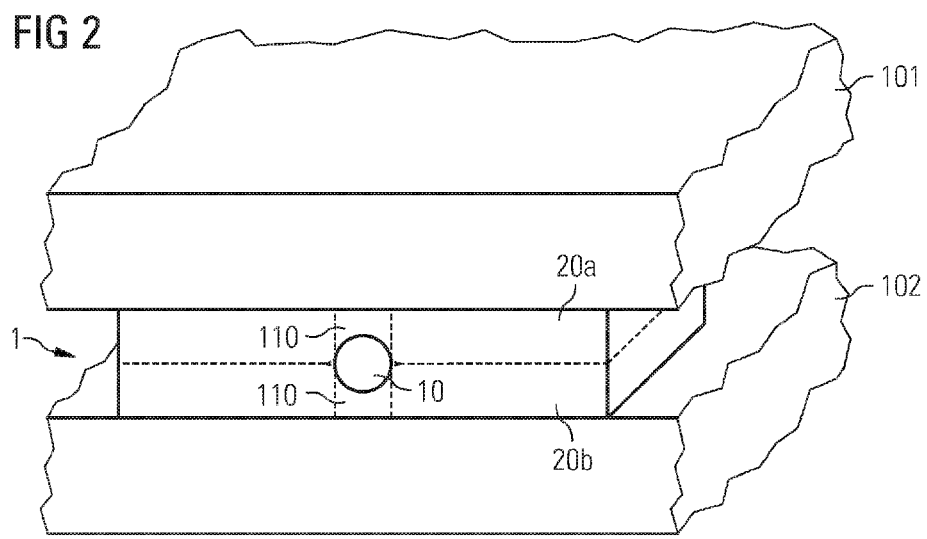
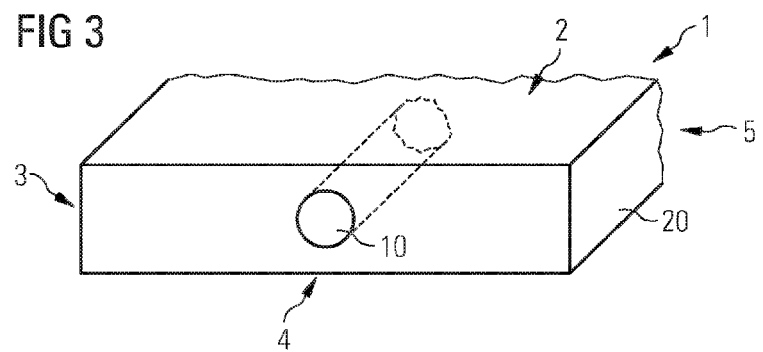

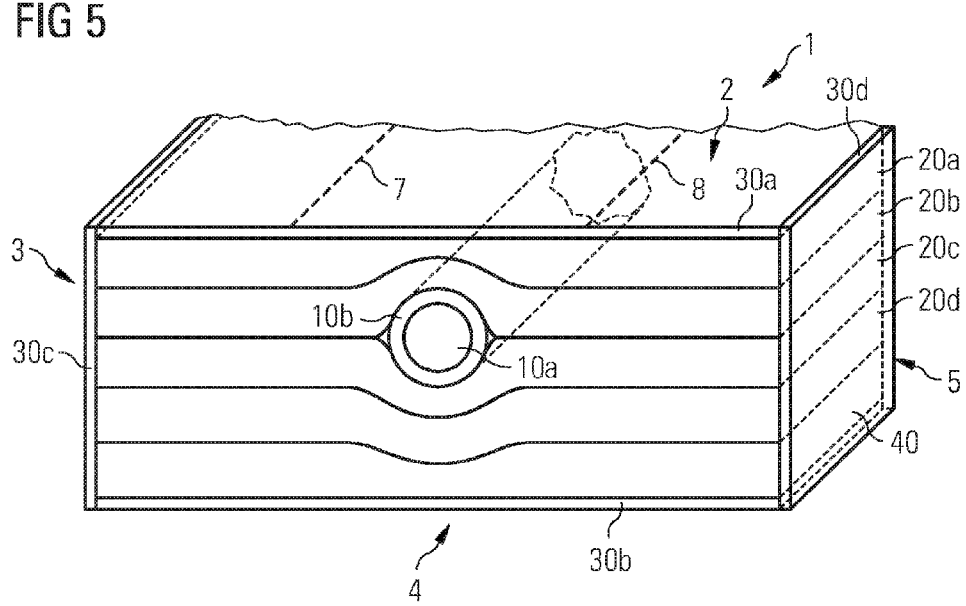

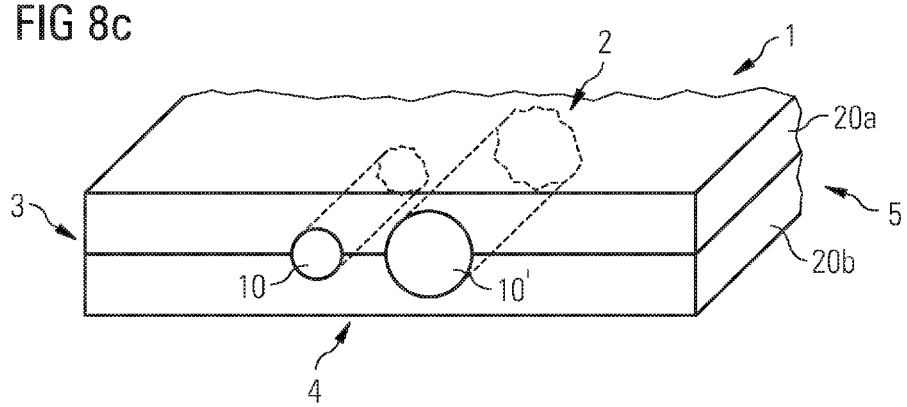
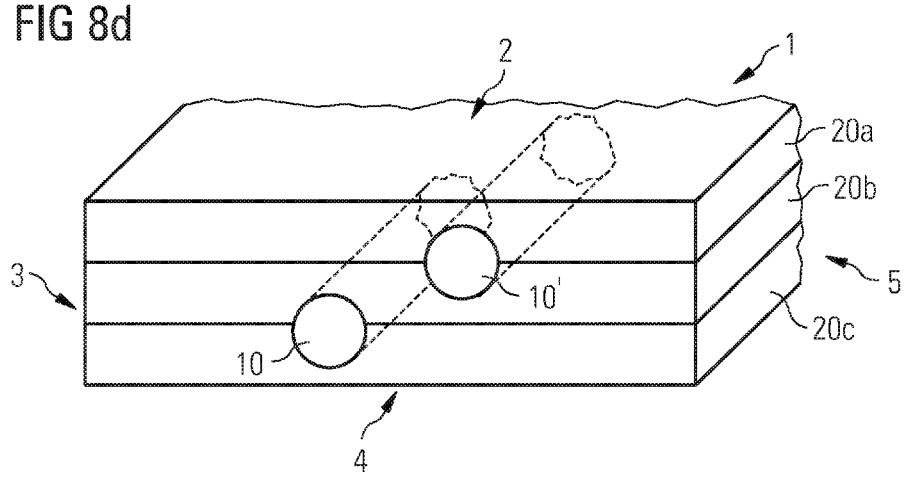

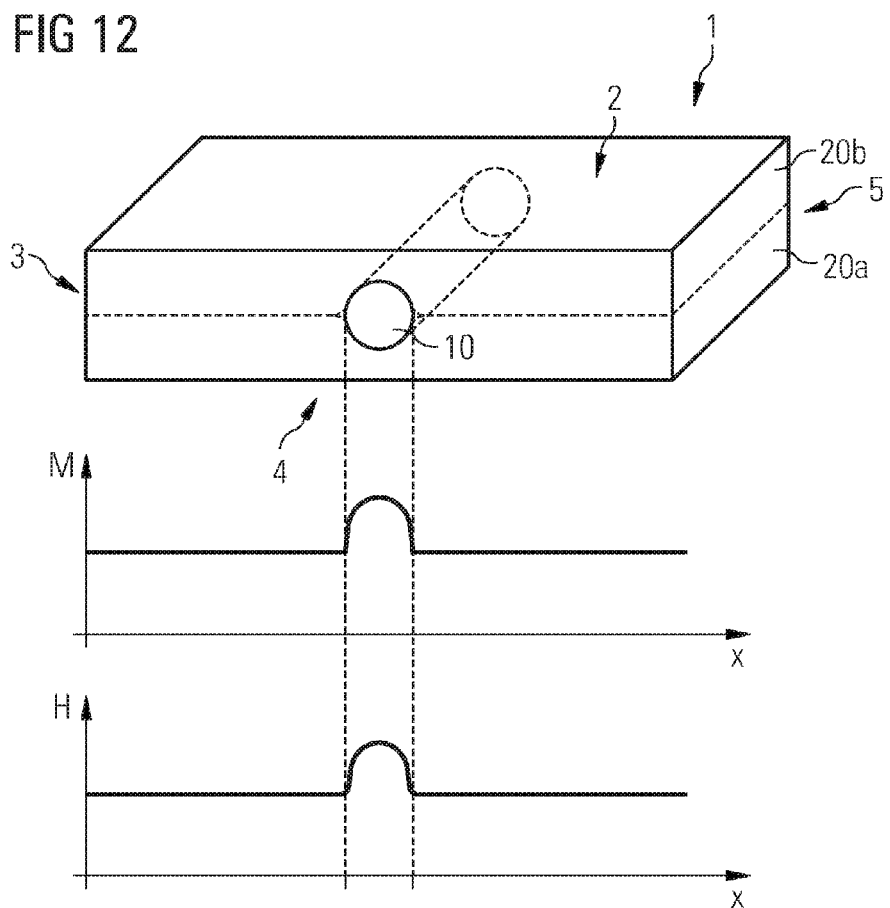

FIG 15a

| Examlpe No. | Thickness of gasket | Method of gasket bonding | Density of Membrane | Hardness 1) of Membrane | Beading Material | Beading profile | Diameter of beading |
|---|---|---|---|---|---|---|---|
| Unit | mm | | g/cm³ | | | | mm |
| 1 | 6 | spray adhesive | 0,76 | 57 | PTFE | round | 2,55 |
| 2 | 6 | spray adhesive | 0,76 | 57 | n.a. | n.a. | n.a. |
| 3 | 6 | spray adhesive | 0,43 | 34 | PTFE | round | 2,55 |
| 4 | 6 | spray adhesive | 0,43 | 34 | PTFE | round | 3 |
| 5 | 6 | spray adhesive | 0,43 | 34 | PTFE | round | 1,8 |
| 6 | 6 | spray adhesive | 0,43 | 34 | PTFE | round | 1 |
| 7 | 6 | spray adhesive | 0,43 | 34 | ePTFE | round | 1,8 |
| 8 | 6 | spray adhesive | 0,43 | 34 | ePTFE | square | 2,5 x 2,5 |
| 9 | 6 | spray adhesive | 0,43 | 34 | polyamide 6 | round | 0,7 |
| 10 | 5,2 | sewn | 0,5 | 36 | PTFE | round | 1,5 |
| 11 | 5,2 | sewn | 0,5 | 36 | PTFE | round | 1,5 |
| 12 | 6,8 | wrapped | 0,62 | 46 | PTFE | round | 1,3 |
| 13 | 6 | spray adhesive | 0,43 | 34 | Viton® | round | 2 |
| 14 | 6 | spray adhesive | 0,43 | 34 | silicone | round | 2 |
| 15 | 6 | spray adhesive | 0,43 | 34 | polyurethane | round | 1 |
| 16 | 6 | spray adhesive | 0,43 | 34 | PTFE | round tube | OD 1,6 ID 0,8 |
| 17 | 6 | spray adhesive | 0,43 | 34 | Copper | round | 1,35 |
| 18 | 6 | spray adhesive | 0,43 | 34 | PTFE | rectangular | 2,8 x 0,7 mm² |
| 19 | 6 | spray adhesive | 0,43 | 34 | PTFE | rectangular/step | n.a. |

1) Hardness test according to Shore A (ASTM D2240)
n.a. not applicable
n.m. not measured

FIG 15b

| Expl. No. | Density of beading | Hardness2) of beading | Thickness ratio beading/ membrane | Density ratio beading/ membrane | Hardness ratio beading/ membrane | Mass ratio gasket/ membrane 3) | PQR of gasket 4) | Leakrate at 10 MPa | Leakrate at 20 MPa |
|---|---|---|---|---|---|---|---|---|---|
| Unit | g/cm³ | | | | | | | mg/m*s | mg/m*s |
| 1 | 2,21 | >90 | 0,43 | 2,9 | >1,58 | 1,0825 | 0,40 | 4,11E-03 | 1,92E-03 |
| 2 | n.a. | n.a. | n.a. | n.a. | n.a. | 1 | 0,43 | 1,72E+00 | 1,12E-01 |
| 3 | 2,21 | >90 | 0,43 | 5,14 | >2,65 | 1,146 | 0,39 | 1,00E-02 | 3,34E-03 |
| 4 | 2,1 | >90 | 0,5 | 4,88 | >2,65 | 1,192 | n.m. | 8,53E-03 | 3,87E-03 |
| 5 | 2,23 | >90 | 0,3 | 5,19 | >2,65 | 1,073 | n.m. | 1,27E-02 | 1,92E-03 |
| 6 | 2,1 | >90 | 0,17 | 4,88 | >2,65 | 1,021 | n.m. | 1,72E-02 | 3,86E-03 |
| 7 | 0,9 | 46 | 0,3 | 2,09 | ca. 1,3 | 1,030 | n.m. | 5,98E-02 | 1,94E-03 |
| 8 | 1,06 | 74 | 0,42 | 2,46 | 2,18 | 1,086 | n.m. | 4,81E-02 | 2,43E-03 |
| 9 | 1,14 | 100 | 0,12 | 2,65 | 2,94 | 1,006 | n.m. | 1,47E-01 | 2,00E-03 |
| 10 | 2,2 | >90 | 0,29 | 4,4 | >2,5 | 1,023 | n.m. | 1,44E-02 | 2,50E-03 |
| 11 | 2,2 | >90 | 0,29 | 4,4 | >2,5 | 1,023 | n.m. | 9,15E-03 | 2,44E-03 |
| 12 | 2,1 | >90 | 0,18 | 3,4 | >1,95 | 1,022 | n.m. | 1,05E-02 | 2,76E-03 |
| 13 | 1,8 | 75 | 0,33 | 4,19 | 2,2 | 1,073 | n.m. | 1,10E-02 | 3,17E-03 |
| 14 | 1,1 | 60 | 0,33 | 2,56 | 1,76 | 1,045 | n.m. | 8,00E-02 | 3,88E-03 |
| 15 | 1,15 | 85 | 0,17 | 2,67 | 2,5 | 1,012 | n.m. | 1,14E-01 | 3,02E-03 |
| 16 | 1,7* | >90* | <0,27* | 3,95 | >2,65* | 1,044 | n.m. | 1,65E-02 | 3,06E-03 |
| 17 | 9 | >100 | 0,23 | 20,9 | >2,94 | 1,17 | n.m. | 1,02E-02 | 3,89E-03 |
| 18 | 2,2 | >90 | 0,12 | 5,12 | >2,65 | 1,056 | n.m. | 1,45E-02 | 3,18E-03 |
| 19 | 2,2 | >90 | 0,33 | 5,12 | 2,65 | 1,24 | n.m. | 7,40E-03 | 3,64E-03 |

2) Hardness of beading is estimated based on measurements on larger samples
3) Mass ratio gasket/membrane is defined in context with the working examples as the total mass of membrane and beading divided by the mass of the membrane.
4) PQR- value determined according to DIN EN 13555
n.a. not applicable
n.m. not measured
* Tube with 2.17 g/cm³ wall density, but total density including the air filled tube results in a density of 1.7 g/cm³ Shore A hardness is > 90, even though the tube is compressed at lower load than full density beading.

LOW LEAKAGE RATE COMPOSITE GASKET

The present invention relates to a gasket for use in sealing applications. A wide variety of gaskets for use in sealing applications are known. Among other materials, gaskets made of expanded polytetrafluoroethylene (ePTFE) having desirable properties are known.

More specifically, the present invention relates to a composite gasket comprising first and second discrete components. The composite gasket of the present invention conforms to the surface of the flanges and requires a low loading force to seal. Composite gasket as used herein is defined as a gasket comprising at least two components.

Gaskets are used to seal flanges in many types of applications. The size and shape of the flanges may vary greatly. In some cases the flanges may be uneven or have surface defects that make it more difficult to seal. In addition, some applications involve a fragile flange, including graphite or glass lined flanges or plastic flanges and fiber reinforced plastic flanges (FRP), which are susceptible to cracking if too much load is applied. In many applications, such as in highly corrosive, high temperature or pharmaceutical environments, fluoropolymer gaskets are required. Fluoropolymer gaskets, such as expanded polytetrafluoroethylene (ePTFE), have very high temperature stability and are chemically inert, but they can require a high load to seal. Therefore, a need exists for a fluoropolymer gasket that has a conformable sealing surface and requires a low load to seal.

Generally, when gaskets are placed between two flanges, a certain average clamping pressure must be imposed onto the gasket by the flanges. This is on the one hand necessary in order to attain a pressure by which the sealing surfaces of the gasket are sealed gas-tight against the flanges. On the other hand, some gaskets, particularly gaskets made of expanded polytetrafluoroethylene (ePTFE), require a certain compression in order to sufficiently block permeation of fluid across the width of the gasket. So called low-stress-to-seal gaskets require only a moderate average clamping pressure, e.g. a low-stress-to-seal ePTFE gasket typically requires a clamping pressure significantly below a pressure that would be required to fully densify the gasket.

Low-stress-to-seal gaskets may be used e.g. for connecting any type of piping, including steel pipes with a large open cross sectional area and large diameter flanges (e.g. more than 50 cm) for transporting any kind of liquid or gas, including chemically aggressive liquids and gases.

It is desirable to keep the average clamping pressure low, because high stresses require strong flanges and, furthermore, high clamping pressures can damage the gasket itself. In particular, when permanent pressure is imposed over a long time period of several days or months or years, the rather soft and compressible gasket will creep. Creep and relaxation of the gasket can result in leakage which requires even higher surface pressure to maintain initial leakrates. Moreover, keeping the average clamping pressure low allows the use of the gasket in fragile flanges which do not resist high stresses.

In order to increase the creep resistance of an ePTFE gasket, U.S. Pat. No. 5,494,301 proposes to wrap an ePTFE gasket-core with a high strength film. However, the good leak tightness properties of ePTFE gaskets are due to the ability of the soft and compressible ePTFE to conform to the shape of the flanges and thereby level out roughness and unevenness of the flange surfaces. These properties will get lost when the gasket's sealing surfaces are not formed by the compressible ePTFE gasket core but by the high-strength film wrapped around the core. Similar gaskets wrapped with high strength films are described in U.S. Pat. No. 5,486,010 and U.S. Pat. No. 5,492,336.

U.S. Pat. No. 6,030,694 discloses a flat, multi-layered gasket comprising outer layers consisting essentially of conformable porous polytetrafluoroethylene and an inner layer of rigid fluoropolymer material. The rigidity of the sealing material allows the material to be easily handled and installed without the difficulty associated with excessively flexible gasket products, whereas the conformable outer layers provide good sealing properties, permitting the sealing material to fill gaps and imperfections on or between sealing surfaces. The embedded rigid material assures that the sealing material will retain its position during handling, cutting, and mounting without the problems that a "floppy" gasket material may encounter. Additionally, the material is of a consistent character across its entire sealing surface, allowing the material to be cut or modified into a wide variety of shapes and assuring maximum effective sealing area between sealing surfaces.

With the sealing surfaces of the gasket of U.S. Pat. No. 6,030,694 being formed by the soft outer PTFE layers, the above-described drawbacks of U.S. Pat. No. 5,494,301, U.S. Pat. No. 5,494,301, U.S. Pat. No. 5,486,010 and U.S. Pat. No. 5,492,336 are largely avoided. However, the gasket of U.S. Pat. No. 6,030,694 still requires a relatively high clamping pressure.

U.S. Pat. No. 6,485,809 is directed to a gasket comprising a first substantially air impermeable "outer layer" and a second substantially air impermeable "outer layer" and a substantially air impermeable region bridging the first and second substantially air impermeable layer. Therein, the aforementioned outer layers may e.g. correspond to the radial inner part and the radial outer part of a disk-shaped gasket, with the substantially air impermeable region arranged between these parts. The air impermeable region is made of predensified ePTFE and isolates the two parts against each other such that permeation of fluid through the entire gasket is blocked or at least reduced by virtue of the air impermeable region. While this structure requires a relatively low average clamping pressure in use, an even further reduction would be desirable.

Similarly, U.S. Pat. No. 7,361,398 describes an ePTFE gasket comprising densified regions that create an air impermeable barrier substantially continuous from the upper gasket surface to the lower gasket surface for blocking permeation of fluid through the gasket. U.S. Pat. No. 7,179,525 relates to a gasket comprising at least two joined porous ePTFE tapes aligned along their tape side surfaces and a substantially air impermeable layer there between.

It is an object of the present invention to provide a gasket that provides good leak tightness at low average clamp pressures, e.g. less than or equal to 10 MPa gasket surface pressure, while exhibiting high creep resistance, e.g. having a $P_{QR}$ value of at least 0.3 at an initial flange pressure of 30 MPa, 500 kN/mm flange stiffness, and a temperature of 150° C. according to EN 13555:2005.

This object is solved by a gasket with the features of the independent claim. In the dependent claims, preferred embodiments of the inventive gasket are defined.

The gasket according to the present invention has a thickness between two sealing surfaces and further has a length and a width, the width being at least 1.5 times as large as the thickness, said gasket comprising a first discrete component and a second discrete component, the first and second components extending along the length of the gasket and the second component being arranged relative to the first component so as to separate the first component at least from one of the two sealing surfaces, wherein the first component is substantially impermeable for gas and liquids in at least the width direction of the gasket and is relatively hard in at least the thickness direction of the gasket, whereas the second component is relatively soft and compressible in at least the thickness direction of the gasket, the hardness of the relatively soft second component in the thickness direction being lower than the hardness of the relatively hard first component in the thickness direction, and the first component or a section of increased thickness thereof, as compared to its average thickness, extending along the length of the gasket has a width that is less than 50% of the width of the second component.

In other words, the gasket according to the present invention has two opposed sealing surfaces and is defined in terms of its thickness between the two sealing surfaces, its length and width. The gasket may have any shape, such as endless, ring-shaped, rectangular, square, etc. In case of a ring-shaped (i.e. annular) gasket, the length direction extends along the circular central line (between the gasket's circular side surfaces) and the width direction extends radially from the inner circular side surface or inner diameter to the outer circular side surface or outer diameter. Sealing surface as used herein is defined as the surface of the gasket that contacts the flanges. The width of the gasket is at least a factor 1.5 of the thickness of the gasket. The inventive gasket comprises a first discrete component and a second discrete component, the two components extending along the length of the gasket. The second component is arranged relative to the first component so as to separate the first component at least from one of the two sealing surfaces. An important aspect of the invention consists in that the first component is substantially impermeable for gas and liquids in at least the width direction of the gasket and is relatively hard in at least the thickness direction of the gasket, whereas the second component is relatively soft and compressible in at least the thickness direction of the gasket. In this context, the terms relatively soft and relatively hard merely indicate that the hardness of the relatively soft second component (e.g. measured as Shore A hardness) in the thickness direction is lower than the hardness of the relatively hard first component in the thickness direction. Hardness as used herein is defined as a hardness determined by a standardized hardness measuring method, e.g. Shore A hardness. In this context, substantially impermeable for gas and liquids means that there is a high resistance to transport of gas and liquid, preventing virtually any convective air flow, possibly allowing some diffusion based transport (e.g. via solution and diffusion).

Furthermore, according to the invention, the first component—or at least a section of increased thickness thereof, as compared to its average thickness extends along the length of the gasket and has a width that is less than 50%, preferably less than 30%, more preferably less than 20%, and most preferably less than 10% of the width of the second component. Thus, when the first (hard) component is arranged, preferably centrally, along the length of the gasket, the second (soft) component largely extends sideways beyond the hard component, i.e. in the width direction of the gasket. In the following the first component will be referred to as the "hard" component and the second component will be referred to as the "soft" component.

As a result, when the gasket is installed between two flanges and put under pressure by the flanges, the hard component or the section of increased thickness thereof will not be compressed or, at least, will be compressed less than the soft component. Accordingly, the hard component will take up the major proportion of the applied forces. The soft component in line with the hard component will be compressed more than the soft component to the left or right of the hard component. Therefore, there will be applied an increased pressure onto the soft component where the soft component is located between the hard component and one of the flanges (in case that the soft component separates the hard component from only one of the two sealing surfaces) or between the hard component and each of the two flanges (in case that the soft component separates the hard component from both sealing surfaces). In this particular high compression region, the pressure is locally increased in relation to an average pressure by which the gasket is compressed between the flanges. This yields a high leak tightness at a relatively low average surface pressure imposed on the gasket by the flanges.

The density of the soft component is increased in the high compression region as compared to its density in a neighbouring area where the hard component or section of increased thickness thereof is not present, preferably by a factor of at least 1.25, more preferably by a factor of at least 2. Due to the increased density of the soft component within the high compression region, the permeability for gas and liquid of the soft component is reduced within this region. Thereby, a barrier of reduced permeability for gas and liquid is formed in the width direction of the gasket by the combined effect of the hard component (being substantially impermeable for gas and liquid in its width direction even without any applied pressure) and the highly compressed and densified material of the soft component in the high compression region.

Furthermore, since the hard component or section of increased thickness thereof has a width that is less than 50%, preferably less than 30%, more preferably less than 20%, and most preferably less than 10% of the width of the soft component, the remainder of the soft component next to the high compression region supports the material of the highly compressed soft component such that it cannot creep sideways in the width direction of the gasket. The width and the thickness of the soft component in relation to the width and the thickness of the hard component or section of increased thickness thereof required in order to sufficiently support the highly compressed material of the soft component can depend among other parameters on the creep resistance of the material of the soft component, the shape and hardness of the hard component and the clamp pressure applied to the gasket.

In order that the above-described advantageous effects are pronounced, the hard component or section of increased thickness thereof preferably has a thickness that is less than 80% of the thickness of the soft component and more than 5% of the thickness of the soft component, more preferably less than 50% and more than 10% of the thickness of the soft component, and most preferably between 50% and 20% of the thickness of the soft component. Here, thickness of the soft component refers to the initial uncompressed thickness outside the area where the hard component is present.

As mentioned before, the hardness of the soft component (e.g. specified as Shore A hardness) is lower than the hardness of the hard component (e.g. also specified as Shore A hardness or transformed into Shore A hardness). In order that the above-described advantageous effects are achieved, the Shore A hardness of the hard component is preferably greater than the Shore A hardness of the soft component by a factor of 1.1 or higher, more preferably by a factor of 1.25 or higher, even more preferably by a factor of 1.5 or higher, and most preferably by a factor of 2 or higher. In some cases the hardness of the hard component exceeds the range of Shore A hardness (range from 0 to 100), in which case the hardness of the hard component is considered to be greater than 100 Shore A.

In case that some of the material properties mentioned above and in the following significantly depend on temperature, where no temperature is indicated the specified or claimed ranges and relationships are to be understood at room temperature (approximately 23° C.).

Under certain conditions, the hard component is ideally so hard that it is virtually not deformed under normal conditions, i.e. when the gasket is installed and compressed between two flanges. However, depending on the material of the soft component, the hard component can damage the soft component and, therefore, the hardness of the hard component may be chosen such that the hard component slightly deforms when the gasket is installed. According to a preferred embodiment, the Shore A hardness of the hard component should be greater than the Shore A hardness of the soft component by a factor in the range of 1.1 to 3, more preferably 1.5 to 2.5.

A preferable Shore A hardness of the hard component is greater than or equal to 60, more preferably greater than or equal to 80, and most preferably greater than or equal to 90, and a preferable range of the Shore A hardness of the hard component is 60 to 100 Shore A, more preferable 85 to 100 Shore A. A preferable Shore A hardness of the soft component is lower than or equal to 80, more preferably lower than or equal to 60, and a preferable range of the Shore A hardness of the soft component is 30 to 70 Shore A, more preferable 40 to 60 Shore A.

In a preferred embodiment, a mass profile along the width direction of the gasket is increased in the area where the soft component separates the hard component from the sealing surface, as compared to a neighbouring area where the hard component or section of increased thickness thereof is not present. Thereby, the above-mentioned desirable relationships between the hardness of the hard and soft components, a desirable degree of compressibility and densification of the soft component and a low (virtually zero) permeability for gas and liquids of the hard component can be easily achieved. In this context, the afore-mentioned mass profile is defined as a profile showing the mass of the gasket 1 summed over the entire thickness of the gasket 1 per width and length unit, as a function of the position along the width direction of the gasket.

According to a preferred embodiment, density of the hard component is at least 50%, preferably at least 80%, and may even be up to 95% or more of its theoretical density. In other words, a porosity of the hard component is less than 50%, preferably less than 20%, and may even be up to only 5% or less. Therein, the theoretical density corresponds to the density of the material calculated from the atomic weight and crystal structure, e.g. by $$\rho_{theory} = \Sigma(N_{C,X} \cdot A_X)/(V_C \cdot N_A),$$

wherein $N_{C,X}$ is the number of atoms of type X per unit cell, $A_X$ the atomic weight [kg/mol] of these atoms of type X, $V_C$ the volume of the unit cell [1/m³], $N_A$ the Avogadro constant [1/mol], and $\Sigma$ the summation over all different types of atoms present in the material. With the density of the hard component being almost as high as its theoretical density, the hard component is at best compressible to a very limited degree (until its density reaches the theoretical density). In this way, the hard component can apply a significantly increased pressure onto the soft component in the high compression region, when the gasket is compressed between the flanges. It may be advantageous in some cases when the hard component is entirely incompressible. However, in other situations an entirely incompressible non-deforming hard component might damage the softer component, depending on the material properties of the two components.

Alternatively or in addition, the density of the hard component is preferably greater than the density of the soft component, by a factor of 1.25 or higher, more preferably by a factor of 1.5 or higher, even more preferably by a factor of 2 or higher, even more preferably by a factor of 2.5 or higher, and most preferably by a factor of 5 or higher. In other words, the porosity of the hard component is lower than the porosity of the soft component. Such a material of the hard component having a higher density, i.e. a lower porosity, than the soft component is normally suited to apply a significantly increased pressure onto the soft component in the high compression region, when the gasket is compressed by the flanges. Furthermore, the density of the hard component is preferably greater than the density of the soft component by a factor in the range of 1.5 to 6, more preferably by a factor in the range of 2.5 to 6, and most preferably by a factor in the range of 3 to 6. By limiting the density ratio for the materials of the two components to a factor of 6, and by plastic deformation of the hard component when local compressive stresses exceed 30 MPa, in many cases, the significantly increased pressure applied onto the soft component in the high compression region can be limited and, thereby, damage to the soft component by the hard component can be avoided or reduced.

Since the sealing surface(s) is(are) formed by the soft component, the material of the soft component has to be chosen such that it can level out roughness and unevenness of the flange surfaces, if needed by shimming, i.e. adding pieces of soft material, while maintaining some surface pressure between the flanges. On the other hand, the material of the hard component not having to level out roughness and unevenness of the flanges is chosen to be harder than that of the soft component so that deformation of the hard component is less than that of the soft component which deforms at least in thickness direction due to densification under the flange pressure.

In any case, the soft component should preferably not show excessive creep, such that a $P_{QR}$-value, which is defined as the ratio of gasket surface pressure after and before relaxation according to EN 13555:2005 and which characterizes the creep resistance, is preferably at least 0.4 or, more preferably, at least 0.5 at a flange stiffness of 500 kN/mm, initial surface pressure of 30 MPa and room temperature (23° C.). The $P_{QR}$-value is preferably at least 0.2 or, more preferably, at least 0.3, at a flange stiffness of 500 kN/mm, an initial surface pressure of 30 MPa and a temperature of 150° C.

The soft and/or the hard component of the gasket preferably comprises or consists of a polymer material, preferably selected from the group consisting of polyamide, polyimide, polyetherimide, polyetheretherketone, polyethersulfone, liquid crystal polymers, ultra high molecular weight polyethylene, polyurethane, rubber, ethylene propylene diene monomer (EPDM) and silicone. It is of particular advantage when the soft and/or the hard component comprises or consists of a fluoropolymer material, in particular a perfluoropolymer, fluoroelastomer and/or perfluoroelastomer, such as e.g.: fluoroethylene propylene (FEP), perfluoralkoxy (PFA), ethylene tetrafluoroethylene (ETFE), ethylene chlorotrifluoroethylene (ECTFE), polychlorotrifluoroethylene (PCTFE), polyvinylidene fluoride (PVDF), polyvinyl fluoride (PVF), vinylidene fluoride hexafluoropropylene VDF-HFP, other fluoroelastomers, or, more preferably, polytetrafluoroethylene (PTFE). These materials provide various advantageous properties as gasket materials, e.g. with regard to compressibility, chemical resistance, strength, creep resistance etc.

In order to further improve creep resistance of the hard and/or the soft component without compromising chemical resistance, ceramic particle fillers like metal oxides (e.g. silicon oxide, aluminium oxide) can be incorporated into the fluoropolymer based material. Alternatively, the hard component can comprise or consist of metal (e.g. Cu), preferably coated with a protective fluoropolymer layer.

As mentioned before, the density (porosity) of the hard component is preferably greater (lower) than the density (porosity) of the soft component, more preferably by the factors already mentioned. In case that the hard component comprises a fluoropolymer material or consists of fluoropolymer, a preferable density of the hard component is at least 35% or higher, more preferably at least 60%, even more preferably at least 90%, and most preferably at least 95% of the theoretical density. In case that the soft component comprises or consists of a fluoropolymer material, a preferable absolute density of the soft component is 1 $g/cm^3$ or less, more preferably 0.8 $g/cm^3$ or less, and most preferably 0.7 $g/cm^3$ or less.

In a preferred embodiment, the soft and/or the hard component comprise or consist of an expanded fluoropolymer, preferably expanded PTFE (ePTFE). The expanded fluoropolymer can be made out of any fluoropolymer that can be expanded to make a porous and permeable article. Suitable materials include expandable fluoropolymers such as but not limited to expanded PTFE, and expanded products made with polymers as described in U.S. Pat. No. 5,708,044 (Branca, 1998), U.S. Pat. No. 6,541,589 (Baillie, 2003), U.S. Pat. No. 7,531,611 (Sabol et al., 2009), U.S. patent application Ser. No. 11/906,877 (Ford), and the like. Expanding the fluoropolymer allows to adjust the compressibility and creep resistance thereof by appropriately setting the process parameters of the expansion process. Preferably, the soft component comprises or consists of layers of uniaxially, biaxially or multiaxially expanded fluoropolymer. More preferably the soft component comprises or consists of biaxially or multiaxially expanded PTFE tapes, or combinations thereof.

A soft component made of ePTFE or comprising ePTFE shows low stress relaxation due to a multidirectional orientation and high tensile strength in both transverse and longitudinal directions resulting in high lateral dimensional stability. This means, due to the high strength in the transverse direction, the gasket profile does not have the tendency to increase in width during compression, even at elevated temperatures.

At least a portion of the soft and/or the hard component may be coated or contain additional materials or fillers to provide desired properties to the gasket e.g. resilience, hardness, electrical conductivity, electrochemical responses, creep resistance and the like. Suitable particulate fillers may include inorganic materials such as metals, semi-metals, metal oxides, glass, ceramics and the like. Alternatively, organic materials can be included, for example carbon, polymeric or elastomeric particles or beads.

Alternatively, the hard component may be made from a porous material having a closed cell pore structure. This way, the component is relatively hard due to the pores being closed. Another hard component design option is a tube, wherein the wall thickness of the tube must be chosen to be higher for materials with low compression modulus, i.e. increased with decreasing compression modulus of the selected material, in order that the required hardness of the tube is provided.

In an alternative embodiment, the hard component comprises or consists of a rolled or wrapped impermeable film, e.g. a film of a (preferably monolithic) fluoropolymer, such as PFA, FEP, PTFE, high-density PTFE, which is rolled upon itself. Such a rolled or wrapped hard component exhibits good creep resistance.

The hard component can easily be embedded between two (or more) soft component layers. The soft component layers can e.g. be adhered to one another using adhesive or by a sintering process, or they can be stitched to one another. Alternatively the soft component layers can be wrapped or stacked one above the other, making use of the self adhesive properties of polymer layers. It is further advantageous when the soft component layers comprise or consist of expanded PTFE (ePTFE). In a preferred embodiment, the hard component comprises or consists of an imbibed expanded fluoropolymer. By imbibing the fluoropolymer, e.g. locally soaking an expanded fluoropolymer with a suitable liquid (e.g. a molten or dissolved thermoplastic fluoropolymer or other polymer liquid), a reinforced (e.g. reinforced ePTFE) fluoropolymer hard component can be formed. Alternatively, the hard component can comprise any other imbibed porous material, such as any other imbibed porous fluoropolymer being at least partially filled with the (eventually dried or hardened) liquid.

Alternatively or in addition, the hard component may advantageously comprise or consist of paste extruded PTFE, sintered PTFE allowing easy production thereof with next to theoretical density. The hard component may also comprise expanded and sintered PTFE. In another embodiment the hard component may comprise an expandeded and sintered PTFE sheet forming a beading by spiral wrapping around itself or around a monolithic metal or polymer core. In a preferred embodiment, the hard component comprises or consists of paste extruded, dried and sintered PTFE. Thereby, it can be ensured that the PTFE has a desired hardness, while maintaining flexibility.

In another preferred embodiment, the hard component comprises or consists of metal, e.g. in the form of a wire. However, metal as the hard component not being deformable under the increased pressure in the high compression region, may cause destruction of the soft component in this region. This partly depends on the cross-section of the hard metal component. Most preferably, however, the material of the hard component is at least slightly deformable under the pressure arising in the high compression region. This can be achieved by using relatively low modulus metals like copper. However, preferably, the metal wire is coated with a fluoropolymer layer which exhibits the desired plastic deformation and which additionally protects the metal wire against attack and corrosion from aggressive media during service of the gasket, since most metals are chemically less resistant than fluoropolymers.

As regards the structure of the gasket, the soft component preferably extends over the entire width of the gasket at least at a portion of the entire length of the gasket. Furthermore, the width of the gasket is preferably constant along the entire length of the gasket and the thickness of the gasket is preferably constant over the entire width of the gasket. As mentioned before, the width of the gasket is at least 1.5 times the thickness of the gasket. It is, however, more preferable that the width of the gasket is at least three times as large as the thickness thereof.

The hard component may have any kind of cross section. However, certain cross sections, such as a circular cross section, an oval cross section, a rectangular cross section or a polygon-shaped cross section, are preferred, because the desired effects can be achieved without the hard component damaging the soft component.

In a preferred embodiment, the hard component has a cross section with a base having a width larger than its thickness and with at least one protrusion extending upwards or downwards (or both) from the base in the thickness direction, the protrusion having a width that is less than the width of the base. As previously stated, it is not required that the entire hard component has a width that is less than 50%, preferably less than 30%, more preferably less than 20%, and most preferably less than 10% of the width of the soft component, but it is sufficient that a section of increased thickness of the hard component fulfils this condition. In the case of the aforementioned preferred embodiment, the base may have a width of more than 50% of the gasket's width, provided that the protrusion forms such section of increased thickness. The wide base of the hard component stabilises the hard component embedded in the soft component.

Even further, as already mentioned before, the hard component may have a hollow cross section, for example in the shape of a round tube.

In order to embed the hard component in the soft component, the soft component may be cut such that a cut line extends from an outer side into the soft component over the length of the gasket. The hard component is then embedded into the cut line along the length of the soft component. Thereafter, the cut line can be closed using adhesive. Alternatively or in addition thereto, at least one stitch line can be provided extending through the cut line and along at least a portion of the length of the gasket, wherein the hard component is embedded in the cut line behind the stitch line, such that the stitch line secures the hard component within the cut line.

Alternatively, the soft component can comprise or consist of several layers, wherein the hard component is preferably embedded between the layers of the soft component. The soft component may comprise an adhesive located between these layers of the soft component. Preferably, the layers of the soft component are adhered to one another by self-adhesion and the hard component is secured between two layers of the soft component. Alternatively or in addition, at least one stitch line extending through at least two layers of the soft component and over at least a portion of the length of the gasket may be provided in order to fix the layers to one another. Preferably, at least a first and a second stitch line extend through the at least two layers of the soft component and over at least a portion of the length of the gasket such that the hard component embedded between the layers of the soft component is located between the first and second stitch lines.

In another embodiment the soft component is folded around the hard component forming a gasket with the hard component embedded in the soft component with just one side open. The hard component can be fixed by sewing a stitch line through the open side of the folded soft component. The soft component can comprise multiple layers to obtain appropriate conformability of the gasket.

The above-mentioned stitch lines preferably comprise PTFE fibre.

In a preferred embodiment, layers of the soft component are bonded to one another using ultrasonic bonding. In analogy, cut lines through the soft component may be closed using ultrasonic bonding. Likewise, the hard component may be bonded to the soft component using ultrasonic bonding.

The hard component preferably comprises a thermoplastic that can be melted to bond the hard component to the soft component. In one embodiment the hard component has a fluoroplastic on a portion of the exterior of the hard component and the fluoroplastic is melted to bond the hard component to the soft component. In one embodiment a fluoroplastic film is wrapped around an expanded PTFE bead and in another embodiment a fluoroplastic is extruded around an extruded PTFE bead.

In any case, adhesive may be provided between the soft and the hard component to further secure the hard component embedded in the soft component at a desired position.

According to preferred embodiment, a multilayer stack of biaxially expanded PTFE (ePTFE) membranes, corresponding to the soft component, is manufactured by continuously wrapping layers of ePTFE one above the other. The number of wraps depends on the thickness of the ePTFE membrane and the desired final gasket thickness, and may comprise up to several hundreds wraps. This manufacturing process is described by Mills et al. in U.S. Pat. No. 5,964,465. In case of the present invention, the wrapping process is interrupted after half of the total number of wraps and the hard component (e.g. a PTFE beading) is introduced by helical wrapping using the transverse feed. The speed of the traverse feed is adjusted to the desired width of the final gasket, to make sure the hard component is in the middle of the final gasket, both in terms of width and thickness of the gasket.

Thereby, a gasket with a soft component comprising at least one layer of biaxially (or uniaxially, if the PTFE is expanded uniaxially) expanded membranes can be formed, wherein the direction of expansion is different to the length and width directions of the gasket.

Generally, the soft component may preferably comprise a plurality of superposed membranes (e.g. more than 100) of expanded fluoropolymer (e.g. ePTFE) together forming an expanded fluoropolymer layer (e.g. an ePTFE layer).

The gasket may be further provided with one or more impermeable layers arranged on one or both of the gasket's two sealing surfaces and/or on one or both of the gasket's two side surfaces extending between the sealing surfaces, in order to reduce permeation of air and liquid through the gasket.

In a preferred embodiment, the gasket comprises at least one further component, the hardness of the further component being lower than the hardness of the hard component, wherein the further component preferably extends over the entire width of the gasket at least at a portion of the length of the gasket. The further components allow for modulating the gasket's deformation properties, hardness properties, compression properties etc. in such a way that it conforms to the shape of a flange even better, in order to provide improved leak tightness.

In another preferred embodiment, the hard component comprises or consists of an inner discrete element and an outer discrete element arranged around the inner element, wherein the inner discrete element and/or the outer discrete element preferably comprises or consists of fluoropolymer and wherein the hardness of the outer discrete element is preferably lower than the hardness of the inner discrete element. The inner discrete element may further comprise a metal or metal oxide, e.g. as a filler material, or may be made of metal. By forming the hard component from several elements, its deformation properties, compressibility, etc. can be modulated.

According to a preferred embodiment, the gasket comprises two or more hard components in order to further improve leak tightness of the gasket. If such a gasket is compressed between uneven flanges, at certain positions of the gasket the regions above and/or below one of the hard components might not be in sufficient contact with the flange or not be sufficiently compressed in order to provide sufficient leak tightness. This will be compensated to a certain extent by the respective other hard component or components.

If several hard components having the same cross section, size, hardness and compressibility are present, an increased clamping pressure has to be applied to the gasket in order that the high compression regions above and/or below the several hard components are sufficiently compressed. However, if hard components of different cross section (in particular round or oval compovents with different diameter or any other components having a different maximum height) and/or different size and/or different hardness and/or different compressibility are provided, gaskets can be designed that are suitable for a relatively wide range of flange pressures. At a low flange pressure, regions above and/or below one of the hard components (normally the largest one) are highly compressed and yield a certain leak tightness. At a higher flange pressure, the afore mentioned hard component is further compressed and, in addition, regions above and/or below another (e.g. smaller and harder) hard component are also compressed and further increase the gasket's leak tightness.

The gasket may, for example, be formed as a form-in-place gasket and/or as a unitary gasket. Furthermore, the gasket may be a ring-shaped (i.e. annular) gasket, i.e. a gasket produced as an uninterrupted (complete) ring, not as a tape. In the case of a ring-shaped gasket, the length direction extends along the circular central line of the gasket and the width direction extends radially.

According to a preferred embodiment, the gasket is cut from a sheet material. Therein, e.g. a compound formed as a sheet and comprising the soft component and the hard component is provided and the gasket, e.g. a ring-shaped gasket, is cut out from this sheet. The sheet may e.g. be formed by fixing two or more layers constituting the second component to one another, with the hard component embedded therebetween.

The gasket in one embodiment is designed with a desired leak tightness, such that a leak rate of nitrogen across the width of the gasket is smaller than 0.1 mg/(m·s), more preferably smaller than 0.02 mg/(m·s), determined according to EN 13555 (test gas is nitrogen instead of He) with the gasket being compressed between two flanges under a load of 10 MPa referring to the initial total surface area of the gasket and an internal gas pressure of 4 MPa.

Furthermore, the gasket in a preferred embodiment is designed for average clamp pressures in the range of 0.5 MPa to 50 MPa, more preferably 5 MPa to 15 MPa, i.e. the gasket preferably provides a desirable leak rate (e.g. as mentioned above) without being damaged at the afore-mentioned clamp pressures.

The present invention furthermore relates to an arrangement comprising the afore-mentioned gasket between two flanges. The flanges can be any type of flanges, such as metal flanges, ceramic flanges, graphite flanges, glass lined steel flanges, plastic flanges or fiber reinforced plastic flanges (FRP). The inventive gasket can also be used with ceramic or glass flanges, which have an uneven surface that may show a slightly convex profile.

Further preferred features and advantages of the invention will arise from the following description of preferred embodiments in context with the drawings, which show schematically:

FIG. 1: a gasket according to a first embodiment of the present invention,

FIG. 2: the gasket of FIG. 1 installed between two flanges.

Figure 4B:
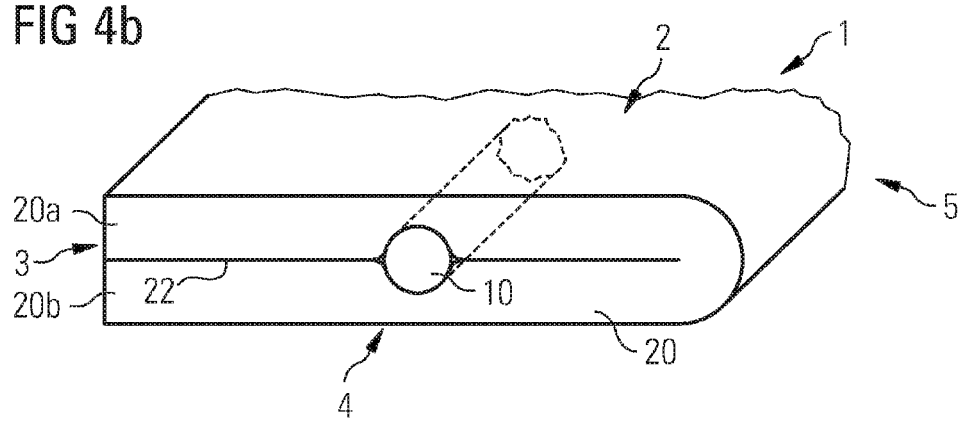
Figure 4C:
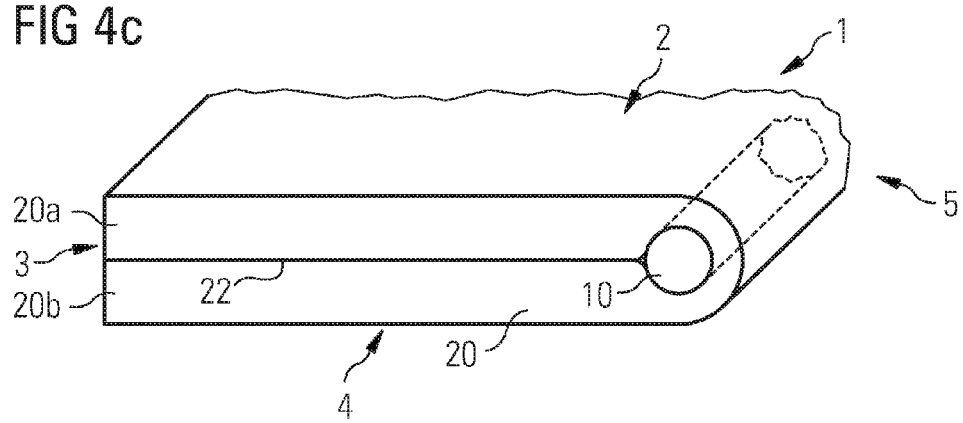
Figure 6A:
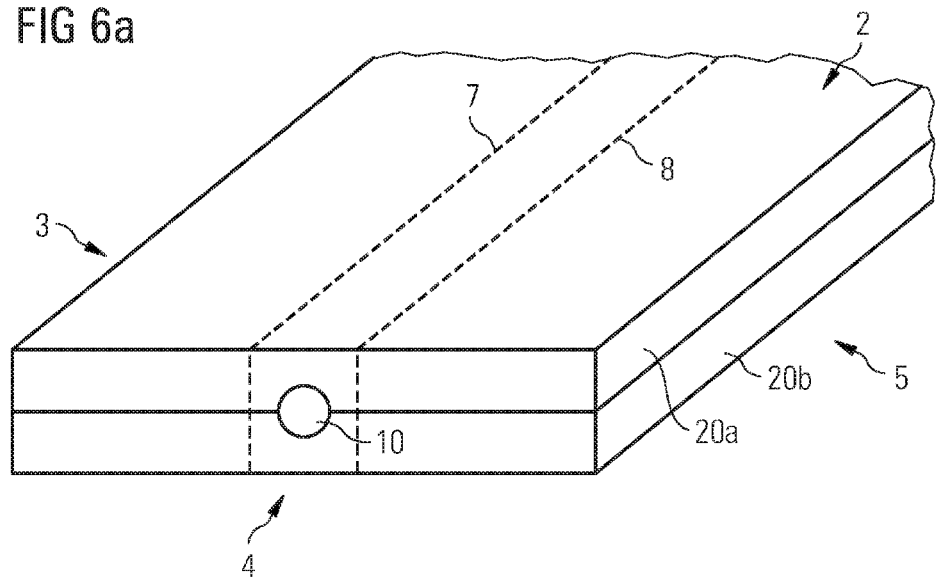
Figure 6B:
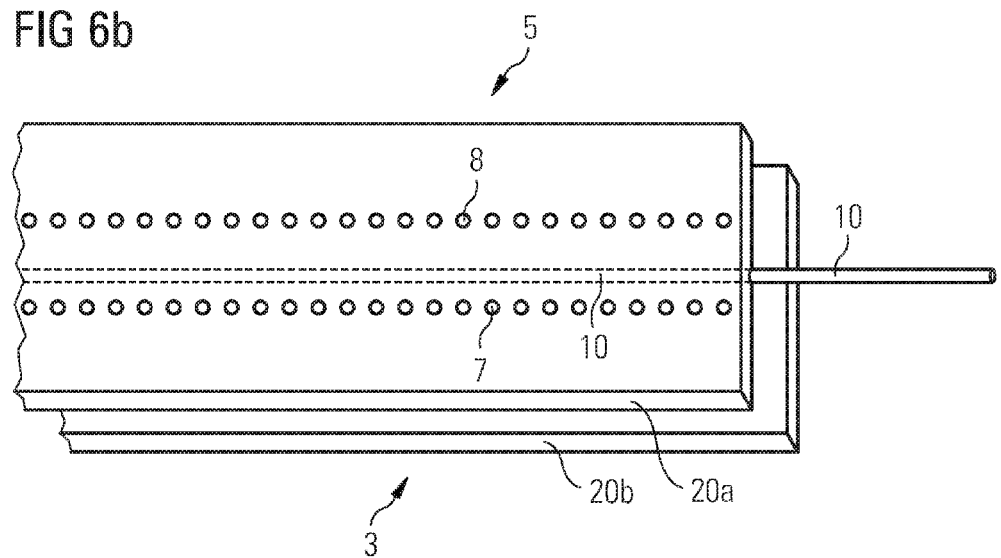
Figure 7:
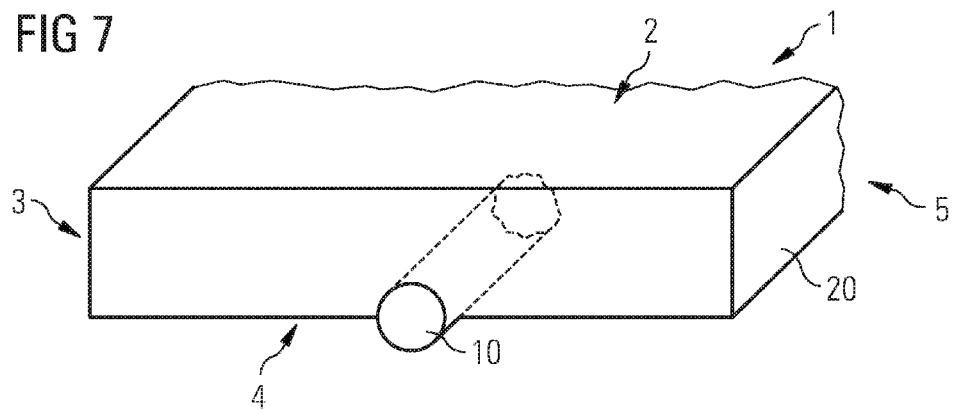
Figure 8A:
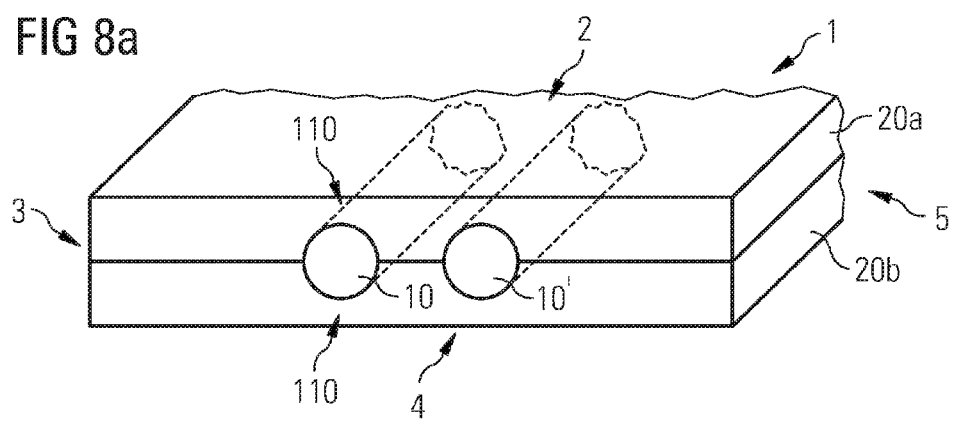
Figure 8B:
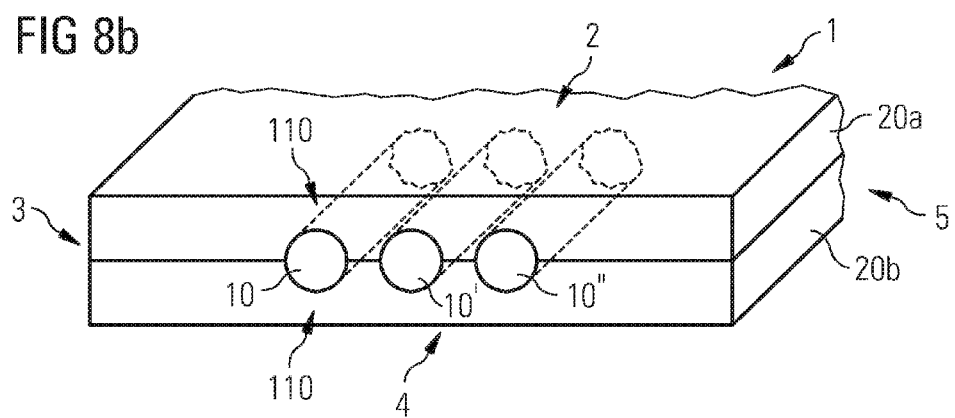
Figure 9A:
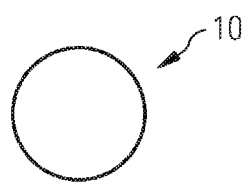
Figure 9B:
Figure 9C:
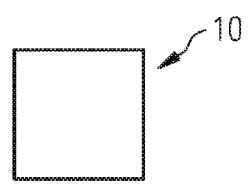
Figure 9D:
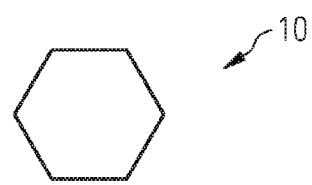
Figure 9E:
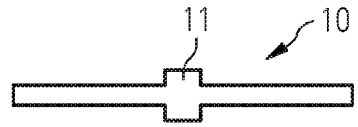
Figure 9F:
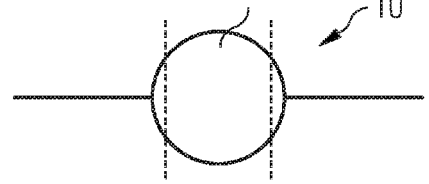
Figure 9G:
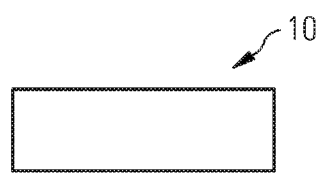
Figure 9H:
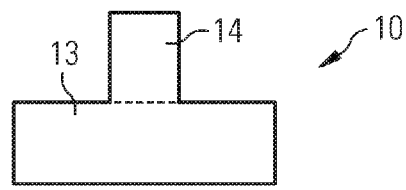
Figure 10A:
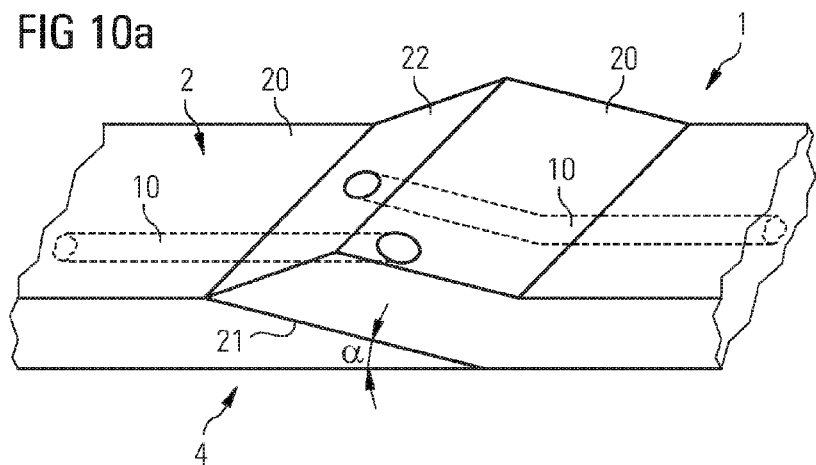
Figure 10B:
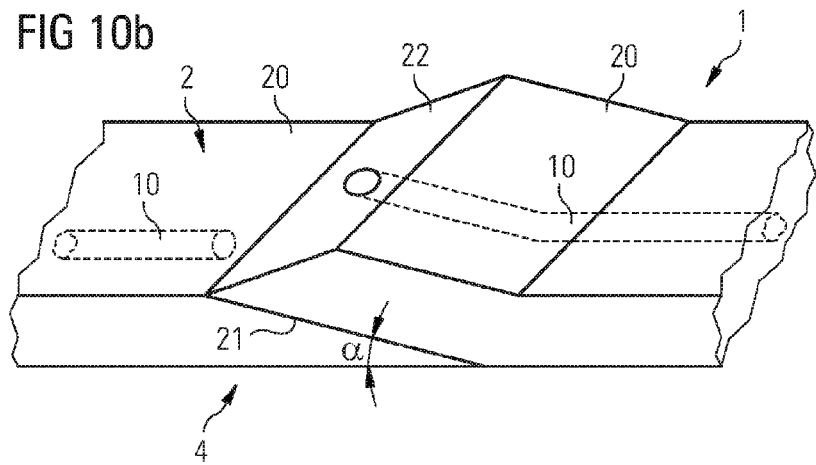
Figure 10C:
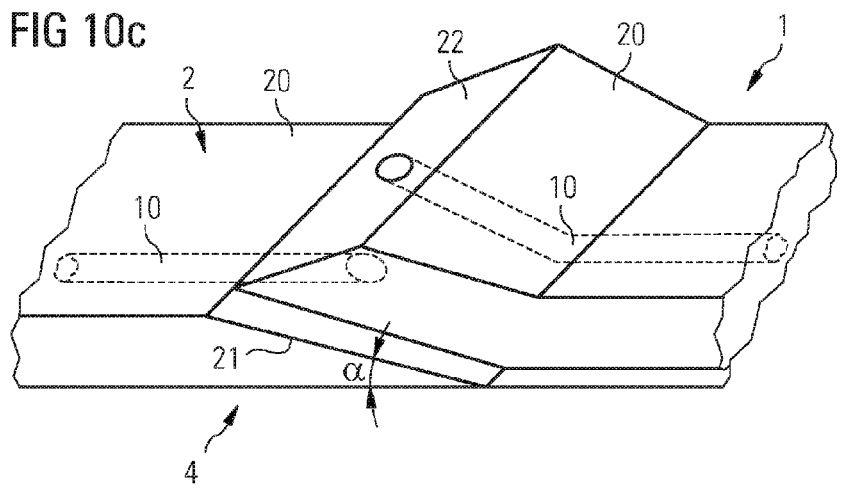
Figure 11A:
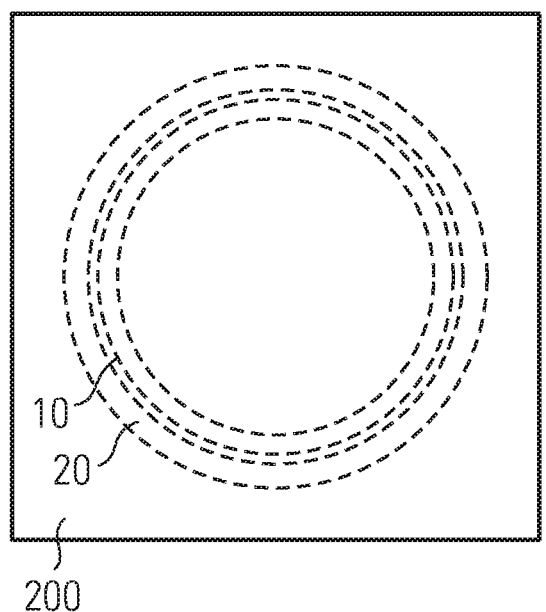
Figure 11B:
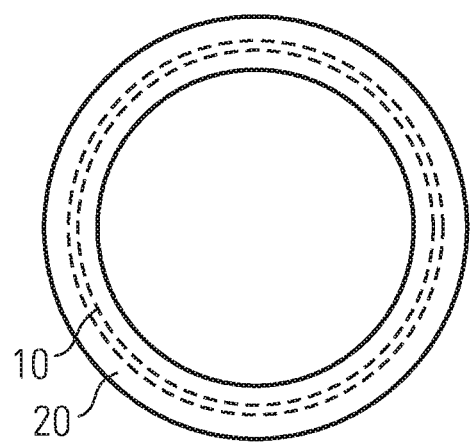
Figure 13A:
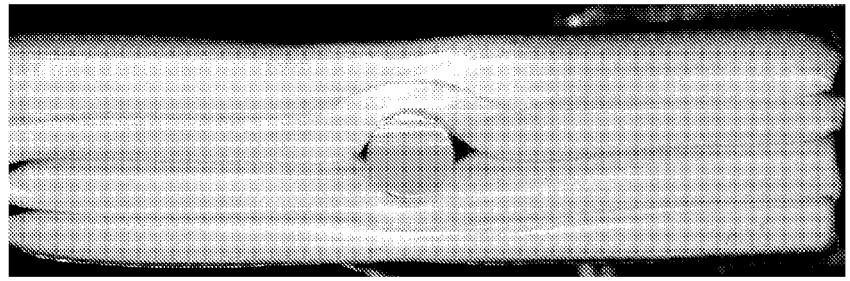
Figure 13B:
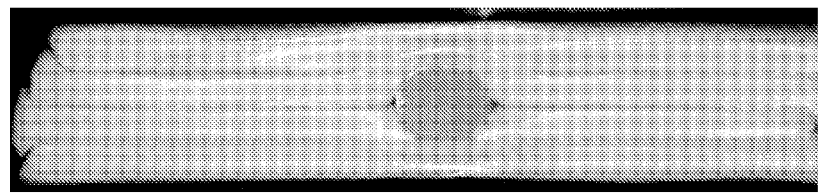
Figure 13C:
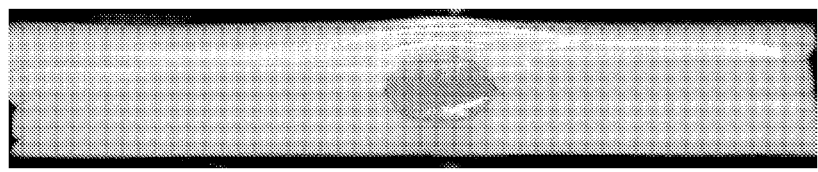
Figure 13D:
Figure 13E:
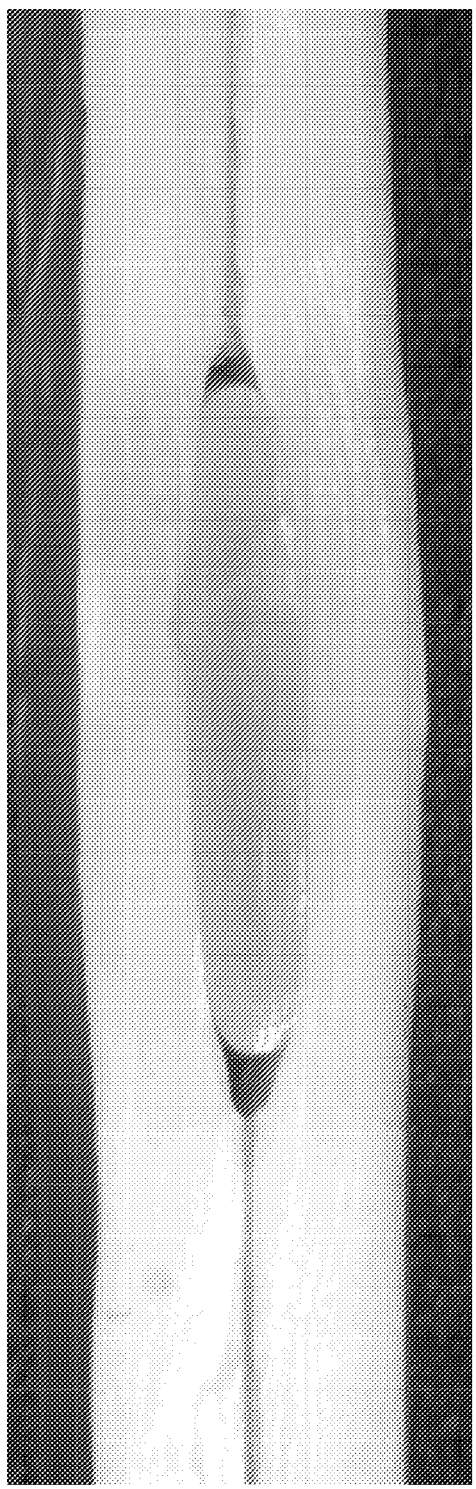
Figure 14:
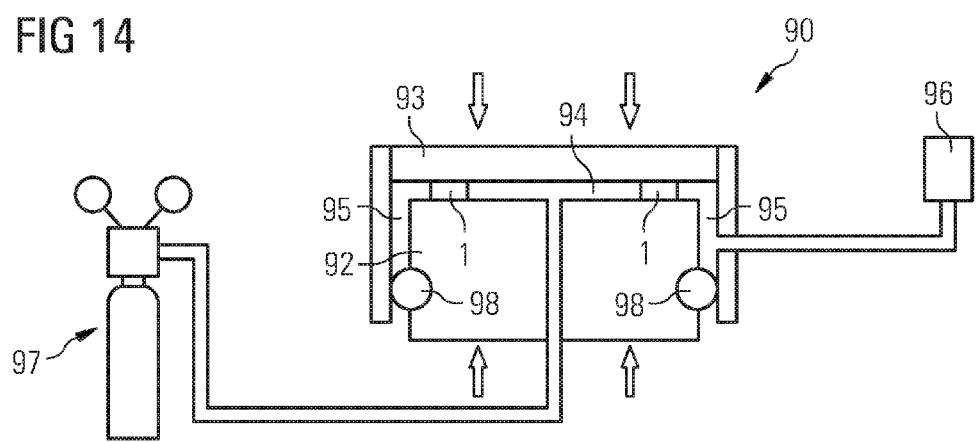

FIG. 3: a gasket according to a second embodiment of the present invention,

FIGS. 4a, 4b and 4c: gaskets according to a third embodiment of the present invention, FIG. 5: a gasket according to a fourth embodiment of the present invention, FIGS. 6a and 6b: a stitching line through a gasket according to the present invention, FIG. 7: a gasket according to a fifth embodiment of the present invention, FIGS. 8a to 8d: gaskets according to a sixth embodiment of the present invention, FIGS. 9a to 9h: examples of cross sections of a hard component of the gasket, FIGS. 10a to 10c: two ends of a gasket according to the present invention, which are connected in order to form a circular gasket, FIGS. 11a and 11b: a sheet material (FIG. 11a) and a gasket (FIG. 11b) cut out from the sheet material, FIG. 12: a cross width mass profile and a hardness profile of the gasket of FIG. 1, FIGS. 13a to 13e: cross section micrographs of a gasket according to the present invention after being compressed between two flanges, FIG. 14: a device for testing leak tightness of a gasket, and FIGS. 15a and 15b: tables with data of working examples.

As mentioned, the drawings are schematic and, therefore, not to scale.

The present invention provides a composite gasket 1 comprising a first discrete component (or "hard component") 10 having a higher hardness than a second discrete component (or "soft component") 20. The first discrete component 10 is preferably attached to the second discrete component 20.

In FIG. 1, a gasket 1 according to a first embodiment is shown. The composite gasket comprises a first discrete component 10 positioned within the second discrete component 20, wherein the first and second sealing surfaces 2, 4 comprise only the second discrete component 20. The second component 20 is relatively soft and is formed by two layers 20a, 20b that are adhered to one another with a relatively hard component 10 embedded there between. The hard component 10 is held in place by self-adhesion of the soft component layers or by applying an adhesive connecting the soft component layers 20a, 20b. The hard component 10 has a width that is less than 10% of the width of the soft component 20 and a thickness that is less than 50% of the total thickness of the soft component 20. The width of the gasket 1 is constant along the entire length of the gasket 1 and more than four times as large as the thickness of the gasket 1 or, more exactly, the thickness of the soft component 20. External sealing surfaces 2 and 4 are formed by the soft component 20. Optionally, the sealing surfaces 2 and 4 can be provided with a further layer, such as a gas and/or liquid impermeable cover layer. The sealing surfaces 2 and 4 preferably have a smooth profile, i.e. a surface with no protrusions or recesses except, may be, a somewhat increased thickness in the area of the hard component 10. Furthermore, side surfaces 3 and 5 of the gasket 1 can likewise be provided with a further layer, such as a gas and/or liquid impermeable side layer.

The hard component 10 is placed centrally to the soft component 20 along the length of the gasket in order that the gasket offers the same properties on each side of the hard component 10. Alternatively, the hard component 10 can be placed at a different thickness or width position in the gasket 1 in order to obtain a gasket 1 with customized different sealing properties at its upper and lower sides and/or in the width direction, respectively. The overall has even sealing surfaces 2 and 4 of the gasket 1, i.e. a substantially constant thickness over the gasket's entire width, automatically results when the hard component 10 is embedded in the soft component 20 during the manufacture of the gasket 1.

The hard and the soft components 10, 20 of the gasket 1 are made of a fluoropolymer, such as PTFE. The hard component 10 has a density of at least 2 g/cm$^3$, which corresponds in the present example to at least 90% of its theoretical density. The soft component 20 may comprise biaxially expanded porous PTFE (ePTFE) with a density of at most 1 g/cm$^3$. Alternatively, the hard component 10 can be made of metal or at least comprise a metal coated with a fluoropolymer. Also, the hard component 10 and the soft component 20 can be made of polymers other than PTFE, in particular chemically resistant and high temperature resistant fluoropolymers.

The soft component 20 is compressible in order to allow the sealing surfaces 2, 4 to adapt to an uneven flange, whereas the hard component 10 is essentially incompressible. The Shore A hardness of the hard component 10 is higher than the Shore A hardness of the soft component 20 by a factor of at least 1.1. The soft component 20 formed of ePTFE layers typically has a Shore A hardness of 34—if formed of four layers—and a Shore A hardness of 46—if formed of a larger number of thinner layers (e.g. more than 20 layers). The hard component has e.g. a Shore A hardness of 74 or 94, respectively.

At least at temperatures ranging from room temperature up to 150° C., the soft component 20 has a higher creep resistance than the hard component 10, and a $P_{QR}$ value of the soft component 20 according to EN 13555:2005 is at least 0.4 at a flange stiffness of 500 kN/mm, an initial surface pressure of 30 MPa and at room temperature (23° C.), and the $P_{QR}$ value is at least 0.2 at a flange stiffness of 500 kN/mm, at an initial surface pressure of 30 MPa and at a temperature of 150° C.

These properties of the soft component 20 can be achieved with an uniaxially or, preferably, biaxially expanded membrane material, such as a fluoropolymer or preferably PTFE, which is sintered after the expansion. The sintering step is relevant to achieve good creep resistance properties, i.e. a high $P_{QR}$ value.

The gasket 1 as shown in FIG. 1 is preferably manufactured by wrapping an extremely thin membrane, such as an ePTFE membrane, around a mandrel as described e.g. by Mills in U.S. Pat. No. 5,964,465 or by Minor in U.S. Pat. No. 6,485, 809. The thickness of the membrane may be in the range of 10 to 100. mu.m, preferably in the range of 20 to 50. mu.m. After a number of wraps sufficient to make up for the desired thickness of the first layer 20a, the hard component 10, such as a sintered bead of PTFE, is wrapped helically onto the surface of the first layer 20a. The pitch of the wrapped PTFE bead 10 is constant and corresponds to the final width of the continuous gasket tape. The PTFE bead is helically wrapped with enough tension to embed the bead into the softer layers of the ePTFE layers. The wrapping angles of the membrane and bead are different. Additional layers of the soft component membrane are wrapped on top of the first layer 20a and PTFE bead 10 to form the second layer 20b. The package of wrapped membranes with the bead embedded therein may then be sintered while secured to the mandrel to bond the layers 20a and 20b together. After cooling, the multilayer membrane tape is helically cut from the mandrel following the bead, thus resulting in a continuous tape gasket with the bead located in the center of the composite. As a result each layer 20a, 20b of the soft component 20 consists of a stack of uniaxially or biaxially expanded membranes, the direction of expansion being different to the direction of the bead (hard component 10) and, thus, different to the length and width directions of the gasket.

According to a preferred embodiment, both the hard component 10 and the soft component 20 are made of an expanded porous fluoropolymer. Suitable materials include expandable fluoropolymers such as but not limited to expanded PTFE, and expanded products made with polymers as described in U.S. Pat. No. 5,708,044 (Branca, 1998), U.S. Pat. No. 6,541, 589 (Baillie, 2003), U.S. Pat. No. 7,531,611 (Sabol et al., 2009), U.S. patent application Ser. No. 11/906,877 (Ford), and the like. The expanded fluoropolymer can also be generally defined by nodes interconnected by fibrils.

Furthermore, the hard component 10 can likewise be made of e.g. melt extruded or paste extruded fluoropolymer, elastomer, thermoset polymer or combinations thereof, and the like. Particularly, the hard component 10 can be made of sintered extruded PTFE or paste extruded PTFE. In any case, the hard component 10 can be sintered and/or can be densified or hardened by the application of heat and/or pressure.

Similarly, also the soft component 20 can be made of materials other than expanded fluoropolymers, namely e.g. of foams, elastomers, non-wovens and the like. In preferred embodiments, however, the soft component comprises or consists of an expanded fluoropolymer of any kind, such as ePTFE. An extruded bead of PTFE as the hard component and an expanded fluoropolymer as the soft component are a preferable combination of materials.

FIG. 2 shows the gasket 1 of FIG. 1 mounted between two flanges 101, 102. Due to the essentially incompressible hard component 10, the soft component 20 is compressed more strongly in a high compression region 110 above and below the hard component 10 as compared to other regions of the gasket 1, and the sealing surfaces 2 and 4 are therefore pressed more strongly against the flanges 101, 102 in this high compression region 110.

Thereby, good sealing between the flanges 101, 102 and the gasket's sealing surfaces 2 and 4 formed by the soft component 20 which conform to the flanges 101, 102 is achieved. Furthermore, the compressed soft component 20 shows very little permeability for gas and liquids within the compression region 110 even at relatively low flange clamping forces. Thus, in combination with the hard component 10, which is essentially impermeable for gas and liquids at least in the width direction of the gasket 1, the compressed gasket forms a barrier with low permeability for gas and liquid at least in the width direction of the gasket 1.

Even though increased forces are acting on the soft component 20 within the high compression region 110, deterioration of the gasket 1 is avoided by (i) the lateral strength and stability of the soft component 20 that prevents creep and failure of the soft component 20 and (ii) plastic deformation of the round hard component 10 resulting in flattening, i.e. formation of an elliptical cross-section which exerts less stress to the soft component and, thus, prevents cutting through the soft component.

In other words, when the gasket 1 is compressed between the flanges 101, 102, the hard component 10 functions as a stress concentrating element generating a discrete region of relatively high compression, corresponding to a discrete sealing area 110. The soft component 20 in the discrete sealing area 110 is compressed more than within areas where the hard component 10 is not present. The discrete sealing area 110 generated by the configuration of the composite gasket 1 is what allows for low leakage rates at significantly reduced compression loads. Therefore, the hard component 10 and the soft component 20 in combination provide low leakage rate at low compression loads.

The density of the soft component 20 is increased significantly in the discrete sealing area 110 and may approach full density, i.e. the theoretical or maximum density. The soft component in some embodiments reaches approximately 90% or more of the theoretically maximum density in the discrete sealing area 110. For example the theoretical maximum density of PTFE is 2.14 g/cc, and 90% thereof is approximately 1.926 g/cc. Cross section photomicrographs of the compressed gaskets after applying different loads are displayed in FIGS. 13a to 13e.

FIG. 3 shows a second embodiment of a gasket 1 corresponding essentially to the gasket 1 of FIG. 1. However, the soft component 20 of the gasket 1 in FIG. 3 is formed of a single component. The hard component 10 is embedded in the soft component already during the manufacture of the soft component. In this second embodiment, the hard component 10 can be embedded in the soft component 20 in a foaming process or, more preferably, by coextrusion, i.e. extrusion of a hard component core, which is not expanded, together with a soft component sheath which, in turn, can be expanded in longitudinal and transverse direction.

FIGS. 4a to 4c show a third embodiment of a gasket 1 corresponding essentially to the gasket 1 of FIG. 1. However, the soft component 20 of the gasket 1 of FIG. 4a is made from a single layer, which can consist of a stack of membranes and which is slit on one side along its entire length. The slit 21 was closed using an adhesive, after the hard component 10 was placed into the slit 21 along the length of the soft component 20. Alternatively, the slit 21 may be closed by stitching through the soft component 20 such that a stitching line (or several stitching lines) is produced and secures the hard component 10 within the soft component 20.

The soft component 20 of the gaskets 1 of FIGS. 4b and 4c, is made from a single layer, which was folded to provide the multilayer gasket 2 comprising an upper layer 20a and a lower layer 20b. In FIG. 4b the hard component 10 is placed at the centre of the gasket 1, yielding a gasket 1 having essentially identical sealing properties in both its width directions. To the contrary, in FIG. 4c the hard component 10 is placed at the bottom of the fold 22 with the soft component 10 folded around the hard component 20. In analogy to the gaskets 1 shown in FIGS. 1 to 4a, the side surfaces 3, 5 of the gaskets in FIGS. 4b and 4c can also be provided with further layers that are impermeable for gas and liquid.

In analogy to the gasket of FIG. 4a, the fold 22 of the gaskets in FIGS. 4b and 4c is closed using an adhesive. Alternatively, the fold 22 may be closed by stitching through the two layers 20a, 20b of the soft component 20 such that the resulting stitching line (or several stitching lines) secures the hard component 10 within the soft component 20.

FIG. 5 shows a fourth embodiment of a gasket 1 corresponding essentially to the gasket 1 of FIG. 1. However, in this embodiment, the soft component 20 consists of four layers 20a, 20b, 20c, 20d, which are self-adhered to one another. Generally speaking, the soft component 20 can consist of any number of layers formed e.g. of thin membranes. Furthermore, the hard component 10 is embedded in locally deformed or densified layers 20b and 20c and adjacent layers in order to obtain a generally flat sealing surface 2, 4. In this embodiment, an additional layer 40 extends over the entire width of the gasket 1. The additional layer 40 has a hardness that is lower than the hardness of the hard component 10 and has a lower creep resistance than the soft component 20 and, thus, allows the gasket 1 to adjust even better to the shape of the flange 102 at the lower side of the gasket 1 in order to level out unevennesses in the surface of the flange 102. An additional layer 40 can also be provided on the upper side of the gasket 1.

In this embodiment, the sealing surfaces 2, 4 are formed by further layers 30a and 30b, which are attached to the soft component 20 and are impermeable to gas and liquid, in order to further reduce permeation through the gasket 1. In analogy, the side surfaces of the gasket 1 are covered with further layers 30c, 30d, which are impermeable to gas and liquid, in order to further reduce permeation through the gasket 1. The further layers 30c, 30d on the side surfaces traverse from the one sealing surface 2 to the other sealing surface 4, thereby providing a layer of impermeable material across the thickness of the composite gasket 1.

The further layers 30a, 30b forming the sealing surfaces preferably have a multilayer structure in that they comprise an impermeable layer and one or more outer layers of a soft material. For instance, the soft outer layers may be made from basically the same material as the soft component 20, such as a fluoropolymer or ePTFE membrane. However, since creep resistance is not of concern for these relatively thin soft outer layers, whereas softness is the major criteria in order to enable the further layers 30a, 30b to conform to uneven flange surfaces, the material of the soft outer layer would preferably not be sintered at high temperatures.

All these further layers 30a, 30b, 30c, 30d can be formed e.g. of an extruded film of fluoropolymer such as FEP, PFA or PTFE copolymers or a dense expanded fluoropolymer material. The further layers 30a, 30b, 30c, 30d being impermeable to gas and liquid, i.e. blocking any convective gas flow.

The layers 20a, 20b, 20c, 20d, 40 are adhered to one another via an adhesive. Also, as mentioned, the soft component 20 can be adhered to the hard component 10 by means of an adhesive. Any suitable adhesive can be used. Preferably, fluoropolymer adhesives including but not limited to thermoplastic fluoropolymers like e.g. fluorinated ethylene propylene (FEP), perfluoroalkoxy (PFA) and tetrafluoroethylene hexafluoropropylene vinylidene fluoride (THV) are used. The adhesive may be applied to the surface of the layers 20a, 20b, 20c, 20d, 40 and/or to the surface of the hard component 10. Alternatively, the adhesive may be incorporated into a film that is wrapped around the hard component 10, or attached to the layers 20a, 20b, 20c, 20d and 40. In the present embodiment, the further impermeable layers 30a, 30b, 30c, 30d are either thermoplastic fluoropolymer films or coatings and therefore do not require an adhesive for fixation.

Furthermore, the layers 20a, 20b, 20c, 20d, 40, 30a, 30b can be held together by stitches along two stitching lines 7 and 8 using PTFE fibers. The stitching lines 7 and 8 further stabilise the gasket 1 and secure the hard component 10 in place. When the stitching lines 7, 8 are provided to stabilise the gasket 1, the afore-mentioned adhesive is not essential but can still be beneficial for improved stabilisation.

In this embodiment, the hard component 10 consists of an inner discrete element 10a and an outer discrete element 10b, the outer discrete element 10b being located around the inner discrete element 10a and preferably having a hardness and/or Youngs modulus and/or resistance to plastic deformation that is lower than the hardness and/or Youngs modulus and/or resistance to plastic deformation, respectively, of the inner discrete element 10a. With the hard component 10 formed of the two elements 10a, 10b, the hardness as well as the deformation properties thereof are "self-adjusting". This means that the elements 10a, 10b of the hard component 10 show an increasing compression strength at increasing flange pressure in order to densify the soft component in the region 110, wherein, however, damage to the soft component 20 by the hard component 10 is avoided.

FIGS. 6a and 6b show a gasket, similar to the gasket of FIG. 1. The gasket 1 is provided with two stitching lines 7 and 8 to attach the two (or in other embodiments more, e.g. 4) layers 20a, 20b of the soft component 20 to one another and to restrain the hard component 10 from moving laterally in the width direction of the gasket 1. During the manufacture, first, a first stitch line (seam) 7 was stitched (sewn) to attach the two layers 20a, 20b of the soft component 20 to one another. Then, the hard component 20 was placed between the two layers 20a, 20b of the soft component 20 close to the stitch line 7. In the case of four (or more) layers, the hard component 20 would be placed between the central layers of the soft component. Thereafter, the second stitch line 8 was produced in such a way that the hard component 10 is embedded between the two layers 20a, 20b of the soft component 20 and the two stitch lines 7 and 8 and thereby restrained from moving in the width direction of the gasket 1 between the layers 20a, 20b.

In FIG. 6b, the two layers 20a 20b of the soft component 20 are shown not precisely aligned to one another due to production inaccuracies. However, the gasket 1 can be cut off at all sides in order to provide more even side surfaces 3 and 5 and end surfaces. Furthermore, the portion of the hard component 10 protruding from between the soft component 20 can be cut off or shortened, if desired.

There are further possibilities to restrain the hard component 10 from moving laterally along the width and/or length direction of the gasket 1. For example, the layers of the soft component 20 may be attached by ultrasonic welding, co-extrusion, or geometrically constraining, such as with concentric tubes thus fixing the hard component 10 in-between the soft component 20. In general, the hard component 10 may be attached to the soft component 20 by any means that sufficiently hold the hard component 10 within or on the soft component 20.

FIG. 7 shows a fifth embodiment of a gasket 1 corresponding essentially to the gasket 1 of FIG. 1. However, in this embodiment, the hard component 10 is not completely embedded in the soft component 20, but is arranged in a groove or recess on the bottom side thereof forming the sealing surface 4. It follows that the hard component 10 separates the soft component 20 from only one of the two sealing surfaces 2, 4.

FIGS. 8a to 8d show a sixth embodiment of a gasket 1 corresponding essentially to the gasket 1 of FIG. 1. However, according to this embodiment, several hard components 10, 10' and 10'' are provided.

The gasket 1 of FIG. 8a comprises two hard components 10 and 10' and the gasket of FIG. 8b comprises three hard components 10, 10', 10'' embedded between the layers 20a, 20b of the gaskets. Independently of the specific materials and layout of the gasket 1, the provision of several hard components 10, 10' helps to achieve a better leak tightness. For example, in the case of uneven flanges 101, 102, the high compression regions or discrete sealing areas 110 above and/or below one of the hard components 10, 10' might not provide sufficient leak tightness between the flanges 101, 102 at all positions of the gasket 1. This can be compensated to a certain extent by providing more than one of the hard components 10, 10'. Of course, when several hard components 10, 10' having the same thickness and hardness (and compressibility) are present, an increased average pressure must be applied to the gasket 1 in order that the several high compression regions 110 above and/or below the several hard components 10, 10' are sufficiently compressed.

However, if hard components 10, 10' of different diameter and/or hardness and/or compressibility are used, a gasket suitable for a wide range of flange pressures can be provided even without the danger of damaging the soft component. For example, the gasket shown in FIG. 8c comprises two (round) hard components 10, 10' of different diameter. When the gasket of FIG. 8c is installed and compressed at low average flange pressure, the large hard component 10' compresses the soft component 20 sufficiently to yield high compression region above and below the large hard component 10', resulting in a relatively good leak tightness.

The material properties (hardness and compressibility) of the large hard component 10' are chosen such that the large hard component 10' deforms sufficiently to avoid damage to the soft component 20 when the gasket is compressed by an increased flange pressure. In such way, the soft component 20 is additionally compressed in regions above and below the smaller hard component 10 so as to yield further high compression regions above and below the smaller hard component 10. These further high compression regions result in an increased leak tightness, when the gasket is compressed under an increased flange pressure.

Further to the above, the hard components 10, 10' may have different cross sections in order to enhance the above-discussed effects.

The soft component 20 of the gasket 1 shown in FIG. 8d comprises three layers 20a, 20b, 20c, and the gasket 1 comprises two hard components 10 and 10' embedded between the layers 20a, 20b, and 20c at different positions in the thickness direction of the gasket 1. By providing the hard components 10 and 10' at different positions in the thickness direction, a gasket with customized sealing properties can be designed. Again, the hard components of FIG. 8d may have different cross sections, sizes, hardnesses and/or compressibilites as outlined above with regard to FIG. 8c.

In case that the gaskets of FIGS. 8a to 8d are to be placed between small diameter flanges, the hard components 10, 10' are preferably placed closely together, ideally as close to the gasket's neutral bending line as possible.

FIGS. 9b to 9f show cross sections of the hard component 10 different to the circular cross sections shown in the previous embodiments and in FIG. 9a. Particularly, the hard component 10 may have a polygonal cross section (e.g. FIGS. 9c and 9d), a square or rectangular cross section (FIGS. 9c and 9g) or an oval cross section (FIG. 9b). Furthermore, a hard component 10 as displayed in FIGS. 9e and 9f can be provided with a width of more than 50% of the soft component 20 provided that a section 11 of increased thickness thereof, as compared to the average thickness of the hard component, extends over less than 50% of the width of the soft component 20. The hard component 10 may consist of several elements of different hardness and geometry, as outlined above with regard to FIG. 5, and/or may even be hollow.

In addition, the hard component 10 may have more complex shapes, particularly more complex shapes incorporating one or several raised sections or protrusions, such as a clover leaf or star like shape.

The hard component 10 rectangular cross section as shown in FIG. 9g having an aspect ratio (height in the thickness direction divided by the width) of 1:3 has proven to be of particular advantage. Even though it exhibits edges, due to its relatively large width, it causes little damage to the soft component 20 as long as it is made of a suitable material. The same is true for the stepped cross section as shown in FIG. 9h having a lower base portion 13 with an aspect ratio of 1:3 and an upper portion 14 with an aspect ratio of 1:1, wherein the aspect ratio of the entire hard component 10 is 2:3.

FIGS. 10a to 10c show two ends of a gasket 1 that are connected in order to produce a circular or ring gasket. When a gasket 1 is provided as a gasket tape and is to be used as a ring gasket, two ends of the tape must be connected. This can in principle be done by methods known in the art. For instance, in a first step, a first end of the gasket 1 (shown on the left side in FIG. 10) is mounted (e.g. adhered) to a flange 102 (not shown in FIG. 10a) and provided with a so-called skive cut. This is a cut along a first plane 21 forming an angle α with the lower sealing surface 4 of the gasket 1 of preferably less than 15°. Then, the second end (shown at the right side in FIG. 10a) of the ring gasket is brought up (e.g. adhered) onto the plane 21, where the first end of the gasket tape has been cut. Thereafter, the second end of the gasket tape is cut along a second plane 22 such that, where both ends of the gasket tape overlap, the resulting ring gasket has a maximum thickness of approx. 120% of the thickness of the gasket tape as provided.

According to a preferred embodiment, the hard component 10 extends along the entire length of the gasket 1 (e.g. the gasket tape). However, e.g. in the case of a ring gasket, both ends of the hard component 10 of the gasket 1 may overlap when the gasket is installed, as shown in FIG. 10a. Depending on the material, size, etc. of the hard component 10 and the soft component 20, this can be acceptable in some cases, however, in other cases the overlapping ends of the hard component 10 can damage the soft component 20. Furthermore, the region of the gasket 1, where the ends of the hard component 1 overlap, might not be sufficiently compressible, which might result in insufficient leak tightness properties of the gasket 1.

In order to avoid these effects, a gasket 1 can be used that comprises a hard component 10, which does not extend over the entire length of the gasket 1, as shown in FIG. 10b. While this may result in a decrease of the leak tightness at a region along the length of the gasket 1 where the hard component 10 is not present, the overall leak tightness of the ring gasket would not be largely affected as long as the hard component 10 extends along most of the length of the gasket 1 (e.g. at least 98%). In this case the additional material at the skive cut can help to fill the potential gap.

Alternatively, the ends of the gasket tape can be brought up onto one another, such that the ends of the gasket tape are not aligned to one another but slightly shifted in the width direction of the gasket 1, such that the ends of the hard component 10 do not overlap, as is shown in FIG. 10c.

In an alternative embodiment, the gasket 1 may be produced as a complete ring gasket, rather than a gasket tape, wherein the hard component 10 preferably extends along the entire length of the ring gasket 1. Thereby, an optimum leak tightness can be achieved.

FIG. 11a shows a sheet material 200, comprising the hard component 10 and the soft component 20 of a circular gasket. In this embodiment, the soft component 20 is formed of at least two sheet layers attached to one another e.g. by an adhesive, ultrasonic welding, stitching, etc., with the hard component 10 embedded between them. However, the sheet material 200 may also be formed in different manners. FIG. 11b shows a ring-shaped gasket that has been cut out from the sheet material 200 of FIG. 11a.

FIG. 12 shows again the gasket of FIG. 1 and further a (cross width) mass profile and a hardness profile of the gasket of FIG. 1. The cross width mass profile shows the mass (M) of the gasket 1 summed over the entire thickness of the gasket 1 per width and length unit, as a function of the transverse position (x) along the width direction of the gasket 1. The hardness profile shows the Shore A hardness (H) of the gasket 1 as a function of the width position (x).

As mentioned above, the hard component 10 of the gasket shown in FIG. 1 has a higher hardness than the soft component 20. Furthermore, the hard component 10 preferably has a higher density than the soft component 20, since such a material is normally suited to apply a significantly increased pressure onto the soft component 20. In this case, the (cross width) mass profile exhibits increased values at positions of the gasket 1 where the hard component 10 and the soft component 20 are present, as compared to regions of the gasket 1 where only the soft component 20 is present. This means that the cross width mass profile is non-uniform, e.g. it exhibits at least one area (corresponds to the region, where the hard component 20 is located) where the mass (M) is increased by e.g. at least 25% as compared to a neighbouring area (where the hard component is not present).

To the contrary, uniform prior art gaskets made of a single component would have a mass profile defined by a flat horizontal line, i.e. a uniform cross width mass profile.

A non-uniform cross width mass profile as described above may even arise in cases where the hard component 10 and the soft component 20 have the same density and the soft component 20 is pre-compressed in regions above and/or below the hard component 10 when embedding the hard component 10 in the soft component 20 during the production of the gasket 1. A non-uniform cross width mass profile may likewise arise when the hard component 10 and the soft component 20 have the same density and the thickness of the gasket 1 is increased at regions where both, the hard component 10 and the soft component 20 are present.

In analogy to the (cross width) mass profile, the hardness profile shows increased values at positions of the gasket 1 where the hard component 10 and the soft component 20 are present, as compared to regions of the gasket 1 where only the soft component 20 is present. This is due to the fact that the hard component 10 has a higher hardness than the soft component 20.

In case that the soft component 20 does not have a recess for accommodating the hard component 10, a bulge would occur when the components 10, 20 are laid one above the other. However, when these components are attached to one another, a pressure is applied (e.g. with the ball of the thumb). The resulting gasket 1 has approximately a constant thickness over its entire width. As a result, the density and thus the hardness of the gasket 1 is increased at locations, where the hard component 10 and the soft component 20 are present, as compared to regions of the gasket 1 where only the soft component 20 is present. This also leads towards the above-described hardness profile even in cases where the starting material of the soft component and the hard component have the same hardness.

FIGS. 13a to 13d show cross section micrographs of a gasket 1 according to the present invention that was initially compressed between two flanges by an average pressure of 1 MPa (FIG. 13a), 5 MPa (FIG. 13b), 10 MPa (FIG. 13c) and 30 MPa (FIG. 13d). The soft component 20 of the gasket 1 in FIGS. 13a to 13d comprises four ePTFE layers and the hard component 10 is a circular PTFE rod. As can be observed in FIGS. 13a to 13d, contrary to the hard component 10 in FIG. 2, the hard component 10 in FIGS. 13a to 13d deforms under the compressive stresses, e.g. the thickness of the hard component is reduced by at least 25% under an average pressure of 30 MPa.

This means that the hard component 10 has initially a round shape and, when the compression load is increased, the hard component 10 slightly deforms and becomes oval. Since, when the load is increased, the hard component 10 deforms and flattens, the high compression region of the soft component 20 is enlarged in the width direction of the gasket 1. For this reason and because the overall stresses imposed onto the soft component 20 are reduced as the thickness of the hard component 10 is reduced and the width thereof is enlarged, damage of the soft component 20 can be avoided by virtue of the deformation of the hard component 10.

FIG. 13e shows a cross section micrograph of a gasket 1 according to the present invention being compressed between two flanges by an average pressure of 30 MPa. The soft component 20 of the gasket 1 of FIG. 13e comprises only two ePTFE layers 20a, 20b and the hard component 10 is a circular PTFE rod.

The gaskets 1 described above can be formed as a form-in-place gasket and/or as a unitary gasket. They provide a leak rate of nitrogen across the width of the gasket 1 that is smaller than 0.1 mg/(m*s), when the gasket is compressed between two flanges 101, 102 at an average surface pressure of 10 MPa and an internal gas pressure of 4 MPa.

The hard component 10 and the soft component 20 can be configured in many ways to create a composite gasket 1 having the low load to seal and conformable sealing surface (s) 2, 4. In one embodiment as depicted in FIG. 1, the hard component 10 is located between two layers 20a, 20b of soft component 20. In another embodiment, two or more hard components 10 are provided to create multiple discrete sealing regions 110 (cf. FIGS. 8a to 8d). In one embodiment the soft component 20 is folded around the hard component (cf. FIGS. 4b and 4c). The soft component 20 may be provided with a recess for accepting the hard component 10. In many applications it is desirable for the composite gasket 1 to have an aspect ratio or, thickness of the gasket 1 divided by the width of the gasket 1 each measured at the longest dimension, of more than 1:2, 1:8, 1:15 or 1:20.

It some embodiments it is desirable that the hard component 10 has an effectively small cross sectional area as compared to the cross sectional area of the composite gasket 1. In some embodiments the cross sectional area of the first discrete component 10 is no more than 10%, no more than 20% or no more than 40% of the cross sectional area of the composite gasket 1. Likewise, in some embodiments it is important that the thickness of the hard component 10 is not too high as compared with the maximum thickness of the gasket 1. In some embodiments it is desirable that the thickness of the hard component 10 is smaller than or equal to 10%, 25% or 50% of the total thickness of the composite gasket 1.

In some embodiments, the hardness and compressibility of the hard component 10 are chosen such that the hard component 10 does not deform when the gasket 1 is compressed by the loads occurring in applications for which the gasket 1 is adapted. In other embodiments, hardness and compressibility of the hard component 10 are chosen such that the hard component 10 does deform under such loads. In some embodiments a combination of first, relatively thick deformable hard component 10 and a second, relatively thin and less or non-deformable hard component 10 results in best performance over a wide range of flange pressures.

In some embodiments the hard component 10 has a tensile strength value of at least 5 MPa in one direction. The hard component 10 can be made in a variety of thicknesses, such as greater than 10 µm thick, or greater than 2 mm, or greater than 30 mm or between 0.5 and 50 mm thick, preferably between 0.5 and 5 mm thick.

WORKING EXAMPLES

In the following, working examples are described. Further data of the working examples can be found in the table in FIGS. 15a and 15b. Therein, the hardness of the membrane (forming the soft component) is given for the membrane as received. In many cases, the hardness of the membrane is increased by compressing the membrane during the manufacture of the gasket, such that the hardness of the resulting soft component in the produced gasket may be higher than the hardness values given in the tables of FIGS. 15a and 15b. In analogy, the "thickness of the gasket" and the "thickness ratio beading/membrane" are derived from the thicknesses of the gasket components as received, i.e. relate to the thickness of the components before they are assembled (and slightly compressed) to form the gasket.

Hardness Measurements

The hardness of the soft components was measured according to ASTM D2240 or ISO 7619 wherein a Shore A durometer was used. The probe of the durometer of Type A was a steel rod with a diameter between 1.1 mm and 1.4 mm having a truncated 35° cone with a flat portion on its front end of 0.79 mm diameter. The probe of the durometer of type A was pressed into the samples by a weight of 0.822 kg resulting in a force of 8.064 N.

The hardnesses of the hard components of the gaskets were estimated based on hardness measurements performed on rectangular samples that are larger than the hard components of the gaskets, but have the same composition and have been processed in the same manner.

Leakage Test

The sealing performance and leakage behaviour of gaskets were tested as working examples in a leakage test on a steel flange test fixture 90 shown schematically in FIG. 14, based on EN 13555:2005 which replaced DIN 28090-1. In this test method, the geometry of the flanges is according to EN 1092-1 DN200/PN10 with a lower flange 92 and an upper flange 93 being pressed against the gasket 1 (as indicated by the arrows), which is placed there between. Leakage rates are measured at room temperature (23° C.) with nitrogen as the test gas. The test gas is provided under 4 MPa gas pressure to a high pressure chamber ("primary chamber") 94 via a gas supply 97, while the gasket 1 is compressed at different loads between the upper flange 93 and the lower flange 92. Leakage from the high pressure primary chamber 94 to a low pressure secondary chamber 95 through the test gasket 1 results in an increase of pressure (which is at ambient level at the start of the test) in the secondary chamber 95, which is sealed by a sealing 98. This pressure increase is proportional to the leakage rate and it is measured with a pressure measuring device 96 as a differential pressure increase relative to the environmental pressure. The lower detection limit of the specific leakage rate is $10^{-4}$ mg/(s·m). The described test method requires a constant temperature. The specific leakage rate L is the gas flow from the high pressure chamber 94 to the low pressure chamber 95 per gasket length and is defined as:

$$L = (\rho_{N2} \cdot V_0 \cdot \Delta P)/(d \cdot \pi \cdot \Delta t \cdot P_0),$$

wherein L is the specific leak rate [mg/(m·s)], $\rho_{N2}$ is the density of nitrogen at ambient conditions=1.25 mg/cm³, $V_0$ is the volume within the test flange, i.e. within the low pressure secondary chamber 95, $\Delta P$ is the pressure change in the low pressure chamber 95 during the test, d is the mean gasket diameter, n=3.1416, $\Delta t$ is the test time to built up $\Delta P$, and $P_0$ is the atmospheric pressure at test start (corresponding to the pressure in the low pressure secondary chamber at test start). The test procedure consists of raising the load of the upper and lower flanges to a gasket stress of 5 MPa. Then, a nitrogen pressure of 4 MPa is applied to the high-pressure chamber 94. Pressure changes in the low pressure chamber 95 are measured and recorded continuously. After one hour, the load at the flanges is increased to a gasket stress of 10 MPa, 20 MPa and 30 MPa. At each load step the leakage is tested for one hour. Surface pressures in MPa refer to the initial gasket surface area.

Conformability Test

Further to the leakage test, a conformability test was conducted for some of the gaskets of the working examples. Conformability was tested according to the above-described leakage test procedure, with the only difference that, before the test, a groove with a depth of 0.5 mm and a width of about 20 mm was formed in the lower flange 92 in a radial direction of the disk-shaped flange 92.

The test procedure consists of raising the load on the upper and lower flange to a line force of 150 N/mm, which corresponds to 5 MPa with a 30 mm gasket width. Then nitrogen is supplied to the high-pressure chamber with a gas pressure of 4 MPa. Pressure changes in the low pressure chamber are measured and recorded continuously. After one hour the load on the flanges is increased in steps of 150 N/mm (corresponding to 5 MPa at 30 mm gasket width) up to a line force of 900 N/mm (corresponding to 30 MPa at 30 mm gasket width), wherein at each load step the leakage is tested for one hour.

Bubble Test

Another type of sealability test, known in industry as "bubble test", was carried out on the gaskets of the comparative working example 2 and working example 5. The gasket was mounted between glass lined steel flanges (DN450/PN10) pressed onto the gasket by 12 clamps extending between the flanges at an outer circumference of the gasket. At first, the bolts were tightened (in a crosswise order in multiple steps with 100 Nm raise each) to a final torque of 300 Nm. In the end a last pass with 300 Nm. This is the standard bolting procedure according to ASME PCC-1. After 30 min seating time another retorque pass with 300 Nm was applied. An air pressure of 1 MPa was applied in the inner chamber between the flanges sealed by the gasket to be tested. The flange and gasket assembly was then sprayed with soapy water solution. Leakage was detected by visual inspection for bubbles along the outer diameter of the gasket. In case of a leak of significant size, soapy water bubbles appeared.

$P_{QR}$ Test to Determine Creep Resistance of the Gasket

The gasket parameter $P_{QR}$ tested according to EN13555:2005 describes the ratio of gasket surface pressures after and before relaxation, i.e. the ratio of the residual and the initial loads from a relaxation test in a compression press used in the displacement controlled mode with a known stiffness. The test was conducted according to EN13555 with a flange stiffness of 500 kN/mm at 150° C., respectively.

Working Example 1

An ePTFE/PTFE composite gasket according to the present invention was made as follows:

Two sheets of GORE® Series 300 Gasket Tape (forming the soft component of the gasket) with a width of 30 mm and a thickness of 3 mm were obtained from W.L. Gore & Associates, Inc., Newark, Del., USA. The tape as received had a density of 0.76 g/cm³ and a Shore A hardness of 57.

A cylindrical rod or "bead" (forming the hard component of the gasket) of PTFE was made by paste extrusion of PTFE resin as taught in U.S. Pat. No. 3,953,566 to Robert W. Gore. The extrudate was dried in a convection oven at 230° C. The density of the dried bead was 1.63 g/cm³. The dried bead was sintered at 380° C. for 5 minutes resulting in a rod with a diameter of 2.55 mm and a density of 2.21 g/cm³. Tensile strength of the rod was 36.2 MPa measured at room temperature. Shore A hardness of the rod exceeded a value of 90, which was measured at larger rectangular samples processed the same way as the rod.

A composite was made with the sintered relatively hard bead embedded in the middle of the two relatively soft layers of GORE® Series 300 Gasket Tape. A thin layer of Spray Mount (3M, St. Paul, Minn., USA) was applied on top of one layer of GORE® Series 300 Gasket Tape and the sintered bead was positioned in the middle of the tape over the full length of the tape. Then, the second layer was stacked on top of the first layer embedding the bead between them, and the composite was bonded together with spray adhesive. Pressure was applied with the ball of the thumb to obtain bonding strong enough to prevent delamination when mounting the composite gasket on the DN200/PN10 steel flange of the leakage tester 90. By applying pressure with the ball of the thumb, the GORE® Series 300 Gasket Tape was compressed, such that the Shore A hardness of the soft component of the produced gasket is higher than the hardness of the Gore Series 300 Gasket Tape as received.

The resulting composite gasket was tested for leakage according to the test method described above, and the results are reported in the table in FIGS. 15a and 15b, in which further data relating to this working example can be found. The leakage test resulted in a leakage rate of $L=0.4 \cdot 10^{-2}$ mg/(s·m) at 10 MPa flange pressure.

Comparative Working Example 2

Samples of GORE® Series 300 Gasket Tape with a width of 30 mm and a thickness of 3 mm were obtained from W.L. Gore & Associates, Inc., Newark, Del., USA.

The tape gaskets were stacked and bonded according to the same procedure as described in working example 1, however, without embedding a bead, to form a comparative gasket. The resulting leak rate was measured with L=1.72 mg/(s·m) at 10 MPa flange pressure, i.e. a factor 430 higher than for the gasket of working example 1.

Conformability of the comparative gasket was tested with the 0.5 mm deep and about 20 mm wide groove in the lower flange, resulting in a leak rate of $L_{5MPa}$=2 mg/(s·m).

The comparative gasket did not pass the bubble test conducted at 1 MPa air pressure, because bubbles appeared at the outer surface of the gasket.

Working Example 3

An ePTFE membrane of 1.5 mm thickness was manufactured based on the methods described in U.S. Pat. No. 3,953,566. The resulting membrane (corresponding to the soft component of the gasket) had a density of 0.43 g/cm³. Tensile strength measured at room temperature was 11.5 MPa in machine direction and 23.2 MPa in transverse direction. Shore A hardness of the 4-layer stack as received was 34.

Four strips of this 1.4 mm thick membrane were slit and cut to 30 mm width and 900 mm length. The resulting strips of ePTFE membrane were bonded using Spray Mount adhesive (3M, St. Paul, Minn., USA). Bonding was enhanced by applying pressure with the ball of the thumb. As discussed above in context with working example 1, thereby, the hardness of the ePTFE membrane is increased, such that the soft component of the prepared composite gasket has a Shore A hardness of more than 34. One of the resulting double layers was grooved in the middle with a blunt chisel to provide a groove as a guide for the bead.

An extruded PTFE rod with 2.55 mm in diameter sintered to full density of 2.2 g/cm³ was used as the bead (hard component of the gasket). The bead was produced substantially according to the method described in working example 1 and had a Shore A hardness exceeding 90.

A double-sided adhesive tape of 15 mm width was applied in the middle of the grooved membrane stack. The bead was put into the groove along the length of the layered membrane strip with the adhesive tape fixing the bead in the correct position. The double-sided adhesive tape has two functions: (i) it bonds the bead to the lower 2-layer membrane stack and (ii) it provides an adhesive layer to bond the second 2-layer membrane stack on top of the first stack with the bead between them. Pressure was applied with the ball of the hand resulting in a flat gasket tape with the bead embedded in the middle of the membrane stack.

The resulting composite gasket had a Shore A hardness of 45 at areas where the soft component, but not the hard component, was present and a Shore A hardness of 56 at areas where both the soft component and the hard component were present.

Leakage testing according to the above-described test method revealed a leak rate of L=0.01 mg/(s·m) at 10 MPa.

Working Example 4

An ePTFE/PTFE composite gasket tape was produced substantially according to the method described in working example 3.

Four layers of a 1.5 mm thick membrane were stacked and bonded as described in working example 3 using a sintered PTFE bead with 3.0 mm in diameter, a density of 2.1 g/cm$^3$, Shore A hardness of more than 90, and a tensile strength of 52.5 MPa. The resulting leak rate was L=8.5·10$^{-3}$ mg/(s·m) at 10 MPa.

Working Example 5

An ePTFE/PTFE composite gasket tape was produced substantially according to the method described in working example 3.

Four layers of a 1.5 mm thick membrane were stacked and bonded as described in working example 3 using a sintered PTFE bead with 1.8 mm in diameter, a density of 2.2 g/cm$^3$, Shore A hardness of more than 90, and a tensile strength of 30.2 MPa. Leakage testing resulted in a leak rate L=1.3·10$^{-2}$ mg/(s·m) at 10 MPa. Conformability testing resulted in a leak rate $L_{5MPa}$ 7.7·10$^{-2}$ mg/(s·m). The gasket passed the bubble test at 1 MPa air pressure without any bubble formation.

Working Example 6

An ePTFE/PTFE composite gasket tape was produced substantially according to the method described in working example 3.

Four layers of a 1.5 mm thick membrane were stacked and bonded as described in working example 3 using a sintered PTFE bead of 1.0 mm and a density of 2.1 g/cm$^3$ density. This bead with a Shore A hardness of more than 90 and a tensile strength of 46.9 MPa is commercially available under Part Number 0000046568 at Zeus®, Raritan, N.J., USA. Leakage tests carried out on the 4-layer composite with the bead centrally between layers 2 and 3 resulted in a leak rate L=1.7·10$^{-2}$ mg/(s·m) at 10 MPa.

Working Example 7

An ePTFE/PTFE composite gasket tape was produced substantially according to the method described in working example 3.

The bead was derived from an extrudate of 1.85 mm diameter. The bead was expanded at 300° C. with a ratio of 2:1 resulting in a density of 0.9 g/cm$^3$ and a diameter of 1.8 mm. The resulting bead had an estimated Shore A hardness of 46. Four layers of this membrane were stacked and bonded with the bead in the centre of the composite as described in working example 3. The leak rate was measured at 10 MPa with L=6.0·10$^{-2}$ mg/(s·m).

Working Example 8

An ePTFE/PTFE composite gasket tape was produced substantially according to the method described in working example 3.

Four layers of a 1.5 mm thick membrane were stacked and bonded as described in working example 3. A rectangular ePTFE rod was derived from a thick uniaxially expanded membrane with a density of 1.06 g/cm$^3$ which was made based on the methods described in U.S. Pat. No. 3,953,566. A square rod was cut from the tape with an edge length of 2.5 mm, i.e. 2.5 mm width and 2.5 mm thickness. Shore A hardness of the square rod was 74. The leak rate of the 4-layer composite with the square rod between the layers 2 and 3 was measured at 10 MPa with L=4.8·10$^{-2}$ mg/(s·m).

Working Example 9

An ePTFE/PTFE composite gasket tape was produced substantially according to the method described in working example 3.

Four layers of a 1.5 mm thick membrane were stacked and bonded as described in working example 3. The bead was a commercially available polyamide 6 wire (Perion®, Conacord, Lippstadt, Germany). Tensile strength testing of the PA6 filament revealed a maximum stress of 527 MPa. The Shore A hardness of the filament was more than 100. The bead with 0.7 mm in diameter was embedded between the central layers in a stack of 4 layers of a thick ePTFE membrane as described in working example 3. Leakage tested resulted in leak rates L=0.15 mg/(s·m) at 10 MPa and L=2.0·10$^{-3}$ mg/(s·m) at 20 MPa.

Working Example 10

An adhesiveless ePTFE/PTFE composite gasket tape was produced by sewing ePTFE layers with a sintered PTFE bead arranged in the center thereof. These ePTFE layers were each single layers of a 1.5 mm thick ePTFE membrane as used in the production of the gasket of working example 3.

A thick ePTFE membrane was manufactured according to the method described in U.S. Pat. No. 3,953,566. The resulting membrane had a thickness of 1.3 mm and density of 0.5 g/cm$^3$. Four rolls of membrane with 30 mm width were slit and spooled with 15 m total length. The four membrane tapes were stacked and longitudinally sewn to one another with Tenara® Sewing Thread-Style TR available from W.L. Gore & Associates. An industrial sewing machine (JUKI DLN-5410M-7, TOKYO JUKI INDUSTRIAL CO., LTD) was used with a round point needle (size 80) applying 3 stiches per centimeter (stitch length 3.0 to 3.5 straight stitch). A first seam was generated at a distance of 11 mm from one edge of the stack in order to stitch together the four membrane layers. Then, a sintered bead with 1.5 mm in diameter, 2.2 g/cm$^3$ density and Shore A hardness of more than 90 was embedded between the inner layers of the 4 layer stack close to the first seam. A second seam was generated at a distance of about 11 mm from the other edge of the membrane stack, thereby enclosing the bead between the layers 2 and 3, and between the two seams holding together the 4 membrane layers.

Leakage testing revealed leak rates of L=6.2·10$^{-2}$ mg/(s·m) at 5 MPa, L=1.4·10$^{-2}$ mg/(s·m) at 10 MPa, and L=2.5·10$^{-3}$ mg/(s·m) at 20 MPa.

Working Example 11

A leakage test with a second sample independently manufactured according to working example 10 showed similar results: L=3.0·10$^{-2}$ mg/(s·m) at 5 MPa, L=9.1·10$^{-3}$ mg/(s·m) at 10 MPa, and L=2.4·10$^{-3}$ mg/(s·m) at 20 MPa.

Working Example 12

An ePTFE membrane with about 30 μm thickness was wrapped around a mandrel as described by Minor in U.S. Pat.

No. 6,485,809. After 110 wraps, a sintered PTFE bead with 1.3 mm diameter was wrapped helically onto the surface using the transverse feed. The pitch between the bead wraps was 30 mm. Then, additional 110 layers of ePTFE membrane were wrapped on top of the membrane stack with bead. The microporous expanded PTFE layers with the embedded PTFE bead were then secured at the ends of the mandrel to resist the tendency of the material to shrink back at elevated temperatures. The package of wrapped layers was sintered while secured to the mandrel in an oven at 370° C. for 2 hours to bond the layers together. After cooling, the multilayer ePTFE membrane tape was helically cut from the mandrel following the bead, thus resulting in a continuous tape gasket with the dense sintered bead in the centre of the composite. The soft component of the produced gasket had a shore A hardness of 51. The hard component thereof had a shore A hardness of more than 90, which was measured with a rectangular sample processed the same way as the bead of 1.3 mm diameter.

The resulting composite gasket had a Shore A hardness of 51 at areas where the soft component, but not the hard component, was present and a Shore A hardness of 54 at areas where both the soft component and the hard component were present. As discussed above, the Shore A hardness of the soft component of the gasket is slightly higher than the Shore A hardness of the ePTFE membrane as received due to compression thereof during the production of the gasket.

Leakage testing revealed leak rates of $L=8.4 \cdot 10^{-1}$ mg/(s·m) at 5 MPa, $L=1.1 \cdot 10^{-2}$ mg/(s·m) at 10 MPa, and $L=2.8 \cdot 10^{-3}$ mg/(s·m) at 20 MPa.

Working Example 13

An ePTFE/PTFE composite gasket tape was produced substantially according to the method described in working example 3.

Four layers of a 1.5 mm thick membrane were stacked and bonded as described in working example 3. The bead was a fluoroelastomer commercially available from Viton®, DuPont Performance Elastomers, Wilmington, Del., USA. The Viton® bead of 2.0 mm diameter with a density of 1.8 g/cm³ and Shore A hardness of 75 was embedded between the central layers in a stack of 4 layers of thick ePTFE membrane as described in working example 3. Leakage testing resulted in $L=3.1 \cdot 10^{-1}$ mg/(s·m) at 5 MPa, $L=1.1 \cdot 10^{-2}$ mg/(s·m) at 10 MPa, and $L=3.2 \cdot 10^{-3}$ mg/(s·m) at 20 MPa.

Working Example 14

An ePTFE/PTFE composite gasket tape was produced substantially according to the method described in working example 3.

Four layers of a 1.5 mm thick membrane were stacked and bonded as described in working example 3. The bead was a silicone bead commercially available from Telle GmbH, Nürnberg, Germany, having a diameter of 2 mm, a density of 1.1 g/cm³ and Shore A hardness of 60. The bead was embedded between the two central layers in a stack of 4 layers of thick ePTFE membrane as described in working example 3. During leakage testing the bead was partially damaged. Leakage testing resulted in leak rates $L=6.6 \cdot 10^{-1}$ mg/(s·m) at 5 MPa, $L=8 \cdot 10^{-2}$ mg/(s·m) at 10 MPa, and $L=3.9 \cdot 10^{-3}$ mg/(s·m) at 20 MPa.

Working Example 15

An ePTFE/PTFE composite gasket tape was produced substantially according to the method described in working example 3.

Four layers of a 1.5 mm thick membrane were stacked and bonded as described in working example 3. The bead was a polyurethane bead commercially available from Telle GmbH, Nürnberg, Germany having a diameter of 1 mm, a density of 1.15 g/cm³ and Shore A hardness of 85. The bead was embedded between the central layers in a stack of 4 layers of thick ePTFE membrane as described in working example 3. Leak rates were $L=1.14 \cdot 10^{-1}$ mg/(s·m) at 10 MPa and $L=3.02 \cdot 10^{-3}$ mg/(s·m) at 20 MPa.

Working Example 16

An ePTFE/PTFE composite gasket tape was produced substantially according to the method described in working example 3.

Four layers of a 1.5 mm thick membrane were stacked and bonded as described in working example 3. The bead was a PTFE tube commercially available from NewAge® Industries, Inc., Southampton, Pa., USA having an outer diameter of 1.6 mm and an inner diameter of 0.8 mm. The tube wall had a density of 2.17 g/cm³ resulting in an average density of the tube filled with air of 1.7 g/cm³. The Shore A hardness of the tube was above 90, even though the tube was compressed at a lower stress than a corresponding full density bead. The tube was embedded between the central layers in a stack of 4 layers of thick ePTFE membrane as described in working example 3. Leak rates were $L=2.6 \cdot 10^{-1}$ mg/(s·m) at 5 MPa, $L=1.6 \cdot 10^{-2}$ mg/(s·m) at 10 MPa, and $L=3.0 \cdot 10^{-3}$ mg/(s·m) at 20 MPa.

Working Example 17

An ePTFE/PTFE composite gasket tape was produced substantially according to the method described in working example 3.

Four layers of a 1.5 mm thick membrane were stacked and bonded as described in working example 3. A copper wire of 1.35 mm diameter having a hardness of more than 100 Shore A and a density of 9 g/cm³ was embedded between the central layers of the membrane formed by four layers as described in working example 3.

The resulting leak rates were $L=2.1 \cdot 10^{-2}$ mg/(s·m) at 5 MPa, $L=1.0 \cdot 10^{-2}$ mg/(s·m) at 10 MPa, and $L=3.9 \cdot 10^{-3}$ mg/(s·m) at 20 MPa. Conformability testing resulted in a leak rate $L_{5MPa}=2.59 \cdot 10^{-2}$ mg/(s·m).

Working Example 18

An ePTFE/PTFE composite gasket tape was produced substantially according to the method described in working example 3.

Four layers of a 1.5 mm thick membrane were stacked and bonded as described in working example 3. A rectangular PTFE rod was derived from a 1 mm thick extrudate tape which was made based on the methods described in U.S. Pat. No. 3,953,566. A strip of 2.8 mm width and 0.7 mm thickness was slit and then dried and sintered for 5 minutes at 350° C. The density of the sintered rod was 2.2 g/cm³ and Shore A hardness exceeded a value of 90.

Leak rates were $L=2.5 \cdot 10^{-1}$ mg/(s·m) at 5 MPa and $L=1.4 \cdot 10^{-2}$ mg/(s·m) at 10 MPa.

Working Example 19

An ePTFE/PTFE composite gasket tape was produced substantially according to the method described in working example 3.

Four layers of a 1.5 mm thick membrane were stacked and bonded as described in working example 3. Rectangular PTFE rods were derived from a 1 mm thick extrudate tape which was made based on the methods described in U.S. Pat. No. 3,953,566. A strip of 5.5 mm width and another strip of 3 mm width were slit and stacked one above the other resulting in a step profile with 2 mm total thickness, a base having a width of 5.5 mm and a thickness of 1 mm and a protrusion extending from the base having a width of 3 mm and a thickness of 1 mm. The stack was dried and sintered for 5 minutes at 350° C. The density of the sintered rod was 2.2 g/cm$^3$ and Shore A hardness exceeded a value of 90.

Leak rates were $L=6.3 \cdot 10^{-2}$ mg/(s·m) at 5 MPa and $L=7.4 \cdot 10^{-3}$ mg/(s·m) at 10 MPa.

What is claimed is:

1. A gasket having a thickness between two sealing surfaces and further having a length and a width, the width being at least 1.5 times as large as the thickness, said gasket comprising a first discrete component and a second discrete component, the first and second components extending along the length of the gasket and the second component being arranged relative to the first component so as to separate the first component at least from one of the two sealing surfaces at a discrete sealing area, wherein
   the first component is substantially impermeable for gas and liquids in at least the width direction of the gasket,
   the second component is a porous fluoropolymer compressible in at least the thickness direction of the gasket,
   the Shore A hardness of the first component in the thickness direction being greater than the Shore A hardness of the second component in the thickness direction by a factor in the range of 1.5 to 2.5, wherein the Shore A hardness of the first component is in the range of 60 to 100 Shore A,
   the first component or a section of increased thickness thereof, as compared to its average thickness, extending along the length of the gasket has a width that is less than 50% of the width of the second component, and
   wherein, upon compression of said gasket over its entire width with an average pressure of 10 MPa, said second discrete component has a first density at said discrete sealing that is at least 1.25 times as great as a second density not in said discrete sealing area.

2. The gasket according to claim 1, wherein the width of the first component or section of increased thickness thereof is less than 30%.

3. The gasket according to claim 1, wherein the Shore A hardness of the second component is in the range of 30 to 70 Shore A.

4. The gasket according to claim 1, wherein a density of the first component is at least 50% of its theoretical density.

5. The gasket according to claim 1, wherein the density of the first component is greater than the density of the second component by a factor in the range of 1.5 to 6.

6. The gasket according to claim 1, wherein the first component comprises an expanded fluoropolymer.

7. The gasket according to claim 1, wherein the second component comprises expanded fluoropolymer.

8. The gasket according to claim 1, wherein the first component has a hollow cross section and/or is made from a porous material having a closed cell pore structure.

9. The gasket according to claim 1, wherein the second component comprises at least one layer formed of a stack of uniaxially or biaxially expanded membranes, the direction of expansion being different to the length and width directions of the gasket.

10. The gasket according to claim 1, wherein the gasket comprises at least one further component, the hardness of the further component being lower than the hardness of the relatively hard first component.

11. The gasket according to claim 1, wherein the gasket comprises two or more first components.

* * * * *

UNITED STATES PATENT AND TRADEMARK OFFICE
CERTIFICATE OF CORRECTION

| | | |
|---|---|---|
| PATENT NO. | : 9,109,700 B2 | Page 1 of 1 |
| APPLICATION NO. | : 13/822778 | |
| DATED | : August 18, 2015 | |
| INVENTOR(S) | : Hermann Scholz | |

It is certified that error appears in the above-identified patent and that said Letters Patent is hereby corrected as shown below:

Title Page, item (57)

In the Abstract, line 4: change "is arranged ranged relative to the first component so as to" to "is arranged relative to the first component so as to";

In the Specification

At column 13, line 33: change "to 100. mu.m, preferably in the range of 20 to 50. mu.m." to "to 100 µm, preferably in the range of 20 to 50 µm.";

At column 22, line 45: change "diameter, n=3.1416," to "diameter, π=3.1416,"; and In the Claims At column 30, line 6: change "sealing that is at least 1.25 times as great as a second" to "sealing area that is at least 1.25 times as great as a second".

Signed and Sealed this
Second Day of February, 2016

Michelle K. Lee
*Director of the United States Patent and Trademark Office*